(12) United States Patent
Wietfeldt et al.

(10) Patent No.: US 12,271,492 B2
(45) Date of Patent: Apr. 8, 2025

(54) MODE SWITCH FOR LINK-BASED AND APPLICATION-BASED SECURITY OPERATIONS

(71) Applicant: QUALCOMM Incorporated, San Diego, CA (US)

(72) Inventors: Richard Dominic Wietfeldt, San Diego, CA (US); Philip Michael Hawkes, Valley Heights (AU); Jonathan Petit, Wenham, MA (US); William Whyte, Natick, MA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 18/188,647

(22) Filed: Mar. 23, 2023

(65) Prior Publication Data
US 2024/0320351 A1  Sep. 26, 2024

(51) Int. Cl.
*G06F 21/60* (2013.01)
*H04L 9/32* (2006.01)

(52) U.S. Cl.
CPC .......... *G06F 21/606* (2013.01); *G06F 21/602* (2013.01); *H04L 9/3242* (2013.01); *H04L 2209/84* (2013.01)

(58) Field of Classification Search
CPC ... G06F 21/606; G06F 21/602; H04L 9/3242; H04L 2209/84; H04L 63/16; H04L 67/12;
(Continued)

(56) References Cited

U.S. PATENT DOCUMENTS 6,965,643 B1 * 11/2005 Maeda ............... H04N 21/8358
375/E7.22
11,303,663 B2 * 4/2022 Datta ..................... G06F 21/60
(Continued)

FOREIGN PATENT DOCUMENTS

CN     106878303 A  *  6/2017
CN     107105169 A  *  8/2017  ............... G06T 7/13
(Continued)

OTHER PUBLICATIONS

Fraiji Y., et al., "Adaptive Security for the Intra-Electric Vehicular Wireless Networks", 2019 15th International Wireless Communications Mobile Computing Conference (IWCMC), IEEE, Jun. 24, 2019, pp. 1215-1220, XP033578092, section IV.A.
(Continued)

*Primary Examiner* — Shahriar Zarrineh
(74) *Attorney, Agent, or Firm* — Loza & Loza, LLP/Qualcomm

(57) ABSTRACT

A method for managing a plurality of imaging devices in a vehicle includes determining that a change of data security mode is indicated for frames of image data transmitted over a first data communication link, determining whether a sensor management system has sufficient processing capacity to support the change of data security mode, increasing the processing capacity of the sensor management system by modifying data security settings for at least one other data communication link when the processing capacity of the sensor management system is insufficient to support the change of data security mode, and initiating the change of data security mode when the sensor management system has sufficient processing capacity to support the change of data security mode. The change of data security mode may include a change from an application-based to a link-based
(Continued)

data security mode or a change from the link-based to the application-based data security mode.

30 Claims, 13 Drawing Sheets

(58) Field of Classification Search
CPC ..... H04L 63/123; G01S 13/867; G01S 13/87; G01S 13/931; G08G 1/04; G08G 1/167; H04N 7/18; H04W 12/106
See application file for complete search history.

(56) References Cited

U.S. PATENT DOCUMENTS

| | | | | |
|---|---|---|---|---|
| 2005/0134710 | A1* | 6/2005 | Nomura | H04N 7/181 348/E5.025 |
| 2017/0011210 | A1* | 1/2017 | Cheong | A61B 5/681 |
| 2017/0244565 | A1* | 8/2017 | Bronk | H04W 12/106 |
| 2017/0313322 | A1* | 11/2017 | Onorato | B60W 50/0098 |
| 2018/0367731 | A1* | 12/2018 | Gatti | H04N 21/4223 |
| 2019/0276031 | A1* | 9/2019 | Hirose | B60W 50/0098 |
| 2020/0098250 | A1* | 3/2020 | Satou | G08B 29/188 |
| 2020/0275019 | A1* | 8/2020 | Johnson | H04N 23/80 |
| 2022/0338012 | A1* | 10/2022 | Monteuuis | H04L 67/12 |
| 2023/0037655 | A1* | 2/2023 | Hurr | B60R 25/24 |
| 2023/0067338 | A1* | 3/2023 | Zhong | H04L 69/321 |
| 2023/0111436 | A1* | 4/2023 | Petit | H04W 4/40 340/902 |
| 2024/0039945 | A1* | 2/2024 | Agrawal | H04L 63/101 |
| 2024/0323691 | A1* | 9/2024 | Wietfeldt | H04L 67/12 |

FOREIGN PATENT DOCUMENTS

| | | | | |
|---|---|---|---|---|
| CN | 108259822 A | * | 7/2018 | |
| CN | 109088848 A | * | 12/2018 | |
| CN | 110660220 A | * | 1/2020 | ......... G06K 9/00369 |
| CN | 111770069 A | * | 10/2020 | ............ H04L 41/14 |
| CN | 113484863 A | * | 10/2021 | |
| CN | 114785543 A | * | 7/2022 | |
| CN | 115348247 A | * | 11/2022 | |
| CN | 115460382 A | * | 12/2022 | |
| CN | 116319029 A | * | 6/2023 | |
| CN | 114553766 B | * | 7/2024 | ............ H04L 41/12 |
| KR | 20040013362 A | * | 2/2004 | |
| WO | WO-2007042798 A2 | * | 4/2007 | ............ B60R 25/00 |

OTHER PUBLICATIONS

Hui H., et al., "Cloud-Based QoS Guarantee Study of Wireless Multimedia Communication", 2012 8th International Conference on Wireless Communications, Networking and Mobile Computing (WICOM 2012): Shanghai, China, Sep. 21-23, 2012, IEEE, Piscataway, NJ, Sep. 21, 2012, 4 Pages, XP032342673, section III.B.

International Search Report and Written Opinion—PCT/US2024/013370 —ISA/EPO—May 27, 2024.

Wietfeldt R., et al., "How the MIPI Security Framework Protects Automotive SerDes Applications from Security Risks", Dec. 31, 2021, XP093060302, 18 Pages, slides 4-6,8,14.

* cited by examiner

Example of a Camera Subsystem

MODE SWITCH FOR LINK-BASED AND APPLICATION-BASED SECURITY OPERATIONS

TECHNICAL FIELD

The present disclosure relates generally to data protection of image data over wired or wireless connections, and more particularly to protecting data transferred between sensors and controllers in a vehicle.

BACKGROUND

Vehicles, including automobiles, trucks, aircraft and watercraft are increasingly fitted with complex electronic systems that are used for system management, control, and security. For example, it is common for vehicles to include a navigation system that, in many instances, can be used to support autonomous operation of the vehicle. In the latter example, a control system may communicate with the navigation system, a steering system and a powertrain or other propulsion system in addition to a variety of sensors that provide feedback used to control operation of the vehicle. The various systems in a vehicle may be implemented using a variety of components such as circuit boards, integrated circuit (IC) devices, application-specific integrated circuit (ASIC) devices and/or System-on-Chip (SoC) devices. The types of components may include processing circuits, user interface components, storage and other peripheral components. A communication infrastructure may be provided to support data communication within and between various systems or subsystems. The communication infrastructure may include some combination of wireless and wired communication links.

Examples of standards that define or control wireless communication that may be deployed or supported within a vehicle include certain standards defined by the Institute of Electrical and Electronics Engineers (IEEE) 802.11 Working Group, the Bluetooth® standards defined by the Bluetooth Special Interest Group (SIG) and radio access standards defined by the 3rd Generation Partnership Project (3GPP).

Examples of standards that define or control wired communication include standards associated with the Inter-Integrated Circuit (I2C or I2C), standards defined by the Mobile Industry Processor Interface (MIPI) Alliance and the CAN bus Standard promulgated by the International Organization for Standardization (ISO).

As device technology improves, increased functionalities may be serviced using data communication links configured for point-to-point or multidrop operation. Mission critical functionalities typically require secure and reliable data communication links. Accordingly, there is an ongoing need to improve the resilience and reliability of data communication links.

SUMMARY

Certain aspects of the disclosure relate to systems, apparatus, methods and techniques that enable mobile communication devices and other portable devices that can discard a number of data packets after an imaging device has been turned on. The number of discarded data packets may be calculated or configured to ensure that corrupted data packets are discarded before processing of the data packets commences.

In various aspects of the disclosure, a sensor management system includes a plurality of imaging devices deployed within a vehicle, a processing circuit that includes a controller and a plurality of data communication links. Each data communication link couples at least one of the plurality of imaging devices with the processing circuit. The processing circuit is configured to determine that a change of data security mode is indicated for frames of image data transmitted over a first data communication link, determine whether available processing capacity of the sensor management system is sufficient to support the change of data security mode, increase the available processing capacity of the sensor management system by modifying data security settings for at least one other data communication link when the available processing capacity of the sensor management system is insufficient to support the change of data security mode, and initiate the change of data security mode when the sensor management system has sufficient processing capacity to support the change of data security mode. The change of data security mode may include a change from an application-based data security mode to a link-based data security mode or a change from the link-based data security mode to the application-based data security mode.

In various aspects of the disclosure, a method for managing a plurality of imaging devices deployed within a vehicle includes determining that a change of data security mode is indicated for frames of image data transmitted over a first data communication link, determining whether available processing capacity of a sensor management system is sufficient to support the change of data security mode, increasing the available processing capacity of the sensor management system by modifying data security settings for at least one other data communication link when the available processing capacity of the sensor management system is insufficient to support the change of data security mode, and initiating the change of data security mode when the sensor management system has sufficient processing capacity to support the change of data security mode. The change of data security mode may include a change from an application-based data security mode to a link-based data security mode or a change from the link-based data security mode to the application-based data security mode.

In various aspects of the disclosure, an apparatus includes means for determining that a change of data security mode is indicated for frames of image data transmitted over a first data communication link, means for determining whether available processing capacity of a sensor management system is sufficient to support the change of data security mode, means for increasing the available processing capacity of the sensor management system by modifying data security settings for at least one other data communication link when the available processing capacity of the sensor management system is insufficient to support the change of data security mode, and means for initiating the change of data security mode when the sensor management system has sufficient processing capacity to support the change of data security mode. The change of data security mode includes a change from an application-based data security mode to a link-based data security mode or a change from the link-based data security mode to the application-based data security mode.

In various aspects of the disclosure, a processor-readable storage medium includes code that, when executed by a processing circuit, causes the processing circuit to determine that a change of data security mode is indicated for frames of image data transmitted over a first data communication link, determine whether available processing capacity of a sensor management system is sufficient to support the change of data security mode, increase the available processing capacity of the sensor management system by modifying data security settings for at least one other data communication link when the available processing capacity of the sensor management system is insufficient to support the change of data security mode, and initiate the change of data security mode when the sensor management system has sufficient processing capacity to support the change of data security mode. The change of data security mode may include a change from an application-based data security mode to a link-based data security mode or a change from the link-based data security mode to the application-based data security mode.

In certain aspects, the link-based data security mode provides a full integrity mode of data protection for the frames of image data transmitted over the first data communication link. The frames of image data may be encrypted after the link-based data security mode is initiated.

In certain aspects, the application-based data security mode protects a first portion of the frames of image data transmitted over the first data communication link using a MAC. A second portion of the frames of image data may be transmitted over the first data communication link are not protected by a MAC. A stride pattern may be defined that specifies lines of image data in the first portion of the frames of image data that are to be protected by the MAC. A stride pattern may be defined that specifies blocks of pixels in the first portion of the frames of image data that are to be protected by the MAC.

In certain aspects, the controller may refrain from initiating the change of data security mode when a power consumption budget or a thermal budget defined for the sensor management system would be exceeded after the change of data security mode is initiated.

In one example, the controller may determine that the change of data security mode is indicated after detecting an increase in temperature or power consumption caused by the sensor management system. In another example, the controller may determine that the change of data security mode is indicated after one or more cameras detect a change in motion based on spatial or temporal dynamic thresholds. In another example, the controller may determine that the change of data security mode is indicated after detecting a high-value camera scene or scene fragment in image data.

In certain examples, an artificial intelligence (AI) agent may be used to determine that the change of data security mode is required. The AI agent may be trained using measurements of power or heat obtained for a plurality of operating conditions. The AI agent may be retrained using real-time system feedback. The change of data security mode is required may be determined based on inferences or predictions received from the AI agent.

DETAILED DESCRIPTION

Figure 1:
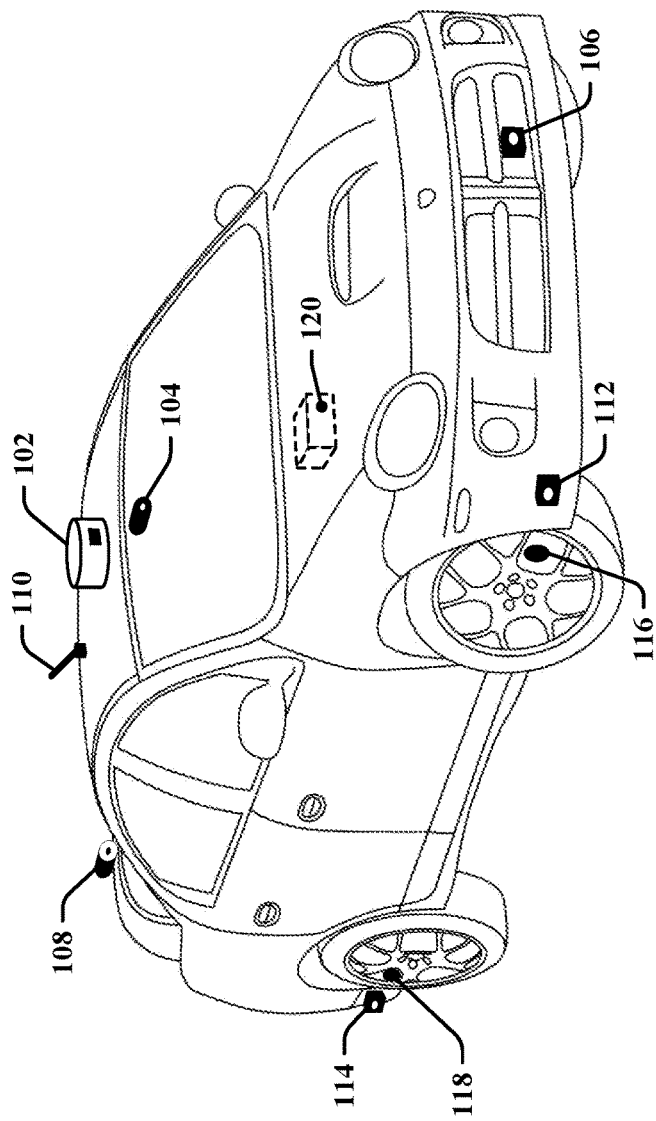
FIG. 1 illustrates an example of systems in an automobile that may be adapted, configured or operated in accordance with certain aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain examples described herein may be implemented using wired communication links to interconnect different parts of a vehicle, including multidrop serial buses that are operated in accordance with a standardized or proprietary protocol. In one example, a serial bus can be operated in accordance with an Inter-Integrated Circuit (I2C or I2C) communication protocol. The I2C bus is configured as a multi-drop bus and was developed to connect low-speed peripherals to a processor. The two wires of an I2C bus include a Serial Data Line (SDA) that carries a data signal, and a Serial Clock Line (SCL) that carries a clock signal. The serial bus may be operated in accordance with a multi-master protocol such that one or more devices may be a designated as a bus master or host device for the serial bus. A device may serve as a bus master or host in some transmissions and as a slave or subordinate device in other transmissions.

In some examples, high-speed serial buses are operated in accordance with standards defined by the Mobile Industry Processor Interface (MIPI) Alliance, such as the Improved Inter-Integrated Circuit (I3C), Radio Frequency Front-End (RFFE), system power management interface (SPMI), camera serial interface (CSI) and display serial interface (DSI) standards. In some examples, the Controller Area Network (CAN) vehicle bus standard may be used in a vehicle to provide a message-based protocol that supports prioritized multidrop operation in which bus contention is resolved by permitting the highest priority contending device to transmit while devices with lower priority refrain from transmitting according to a back off procedure. Certain implementations of the CAN bus are described in the CAN Standard promulgated by the International Organization for Standardization (ISO).

Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Wired data communication links are used to facilitate the description of certain concepts herein. However, these concepts can also be applied to wireless communication links in many implementations. For example, physical communication interfaces can be implemented using either wired and wireless transceivers, or some combination of wired and wireless transceivers. The physical connection between devices may include a wire or a wireless propagation path.

A data integrity architecture provided in accordance with certain aspects of this disclosure provides configurable integrity modes for data communication links that accommodate power budgets while ensuring data security for mission critical functionalities within a vehicle. Data security typically relies on the availability of data communication links that can reliably transport data within and between discrete systems deployed within the vehicle. For some systems or applications, data security may involve data encryption and data integrity services to prevent unauthorized access to information by malefactors and/or the introduction of malicious data, commands or other information into control systems from unauthorized sources.

Certain systems and/or processing circuits may be used to automate features and functions of a vehicle. For example, camera-based systems, proximity indicators, speed and velocity detectors and other systems may provide images and other information that can be used to assist an operator of the automobile. In one example, the images and other information enable the identification of potential hazards, proximate objects, presence of pedestrians and other traffic and/or road conditions. In some instances, a combination of systems and/or processing circuits can enable autonomous operation of an automobile, and can provide feedback and other information to security and vehicle access management systems and to driver assistance systems, including forward collision warning systems, lane departure warning systems, rear cross traffic warning system, blind spot warning systems, vehicle reverse imaging systems, parking assistance, and other driver assistance systems. These and other systems may use some combination of cameras, sensors and location systems including systems based on radio detection and ranging ("radar"), light detection and ranging ("lidar") and/or ultrasonic detection systems.

Examples of sensor management systems provided throughout this disclosure use cameras as a primary example of a type of sensor. However, the concepts, architectures, systems, apparatus, techniques and methods disclosed in these examples applies equally to other types of sensors and location systems including systems based on radar, lidar and/or ultrasonic transducers or sensors.

Certain systems and/or processing circuits may support one or more displays provided within the vehicle. For example, a display subsystem may serve as an instrument panel, an entertainment or media center, one or more view panels that are accessible to passengers, a heads-up display of control information and instruments, and so on. Certain systems and/or processing circuits may manage, configure and control environmental conditions with a cabin of the vehicle, including heating, cooling, lighting and seat configurations.

FIG. 1 illustrates an example of an automobile 100 that includes systems that may be adapted, configured or operated in accordance with certain aspects of this disclosure. The automobile 100 may be equipped with multiple imaging or sensing devices, including the illustrated cameras or sensors 102, 104, 106, 108, 112, 114. The automobile 100 may include sensors such as tire pressure or braking sensors 116, 118. The automobile 100 may also include one or more antennas 110 used for radio frequency reception, wireless communication and/or radio navigation using a global positioning system (GPS). A central controller 120 may be coupled to each of the cameras 102, 104, 106, 108, 112, 114, sensors 116, 118 and antennas 110. The central controller 120 may configure and manage automated systems and/or driver assistance systems. In some implementations, the central controller 120 may be configured to operate as an engine control unit that manages the operation and performance of the engine, motor, motors or other power systems in the automobile 100. In some instances, the central controller 120 may be embodied in an SoC.

Robust data communication links are needed to support the large number of cameras deployed within the automobile 100. In some examples, 20-30 cameras may be deployed to support automation and driver assistance systems. Each camera may be capable of generating data at a rate of between 1-10 gigabits per second (Gbps) resulting in aggregate data rates of up to 300 Gbps. The communication of this volume of data can be expected to result in the consumption of high levels of power and the generation of associated heat from interface and data protection and processing circuits. In conventional systems, data rates may be reduced to control power consumption and heat generation, resulting in loss of image quality.

Figure 2:
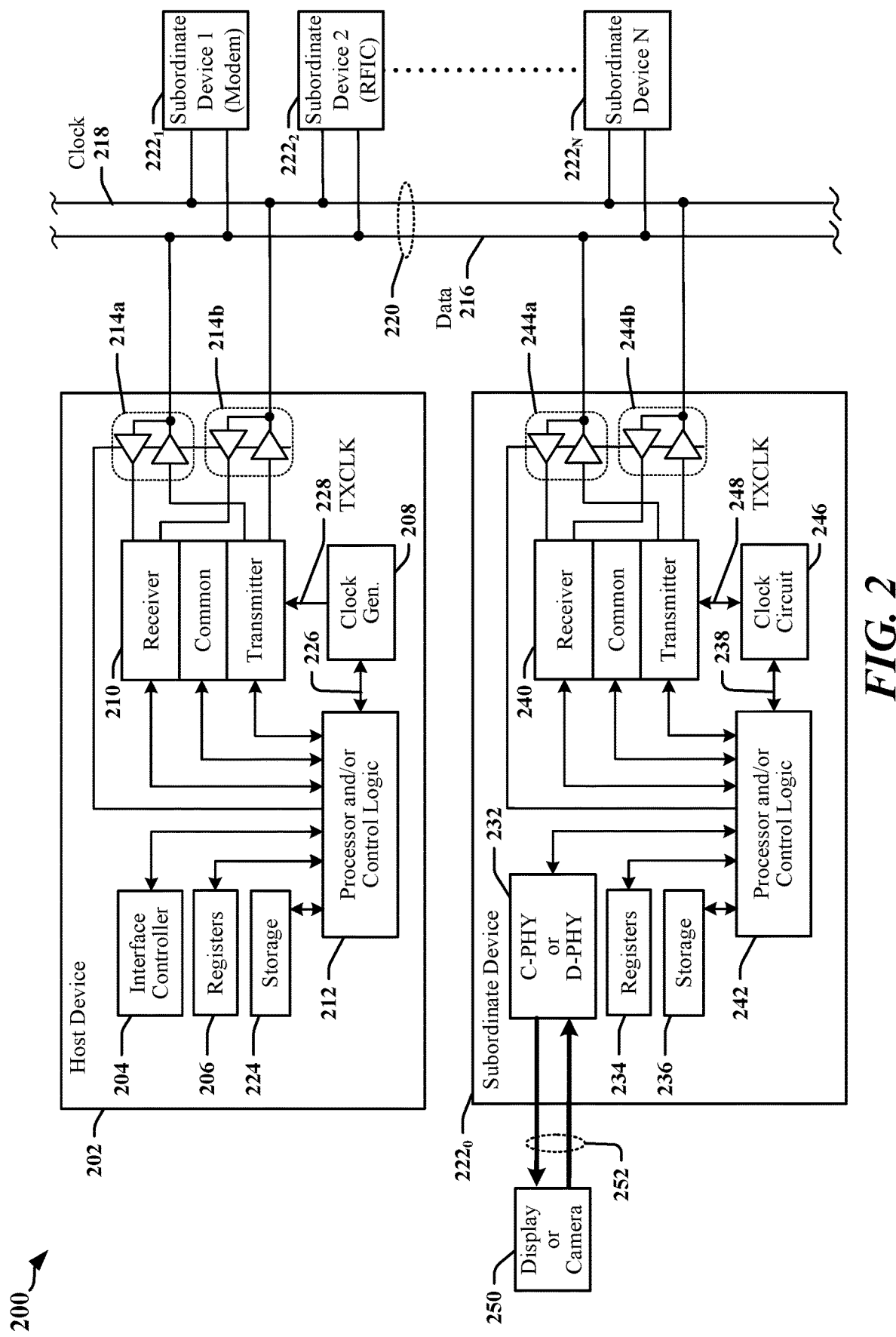
FIG. 2 illustrates an example of an apparatus in a vehicle subsystem that may be adapted in accordance with certain aspects of this disclosure.

FIG. 2 illustrates an example of an apparatus 200 that may be incorporated in a vehicle subsystem that includes sensors and at least one controller that may be adapted in accordance with certain aspects of this disclosure. In the illustrated example, the apparatus 200 includes multiple devices 202, and $222_0$-$222_N$ coupled to a two-wire serial bus 220. The devices 202 and $222_0$-$222_N$ may be implemented in one or more semiconductor IC devices, such as an application processor, SoC or ASIC. In various implementations certain of the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more devices $222_0$-$222_N$ may be used to control, manage or monitor a sensor device. Communication between devices 202 and $222_0$-$222_N$ over the serial bus 220 is controlled by a host device 202. Certain types of bus can support multiple bus masters 202.

In one example, a host device 202 may include an interface controller 204 that can manage access to the serial bus, configure dynamic addresses for subordinate devices and/or generate a clock signal 228 to be transmitted on a clock line 218 of the serial bus 220. The host device 202 may include configuration registers 206 or other storage 224, and other control logic 212 configured to handle protocols and/or higher-level functions. The control logic 212 may include a processing circuit such as a state machine, sequencer, signal processor or general-purpose processor. The host device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a subordinate device on the serial bus 220 and may include circuits and modules that support a display, an image sensor, and/or circuits and modules that control and communicate with one or more sensors that measure environmental conditions. In one example, a device $222_0$ configured to operate as a subordinate device may provide a control function, physical layer circuit 232 that includes circuits and modules to support a display, an image sensor, and/or circuits and modules that control and communicate with one or more sensors that measure environmental conditions. In this example, the device $222_0$ can include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. In some instances, the clock signal 248 may be derived from a signal received from the clock line 218. Other timing clocks 238 may be used by the control logic 242 and other functions, circuits or modules.

The serial bus 220 may be operated in accordance with a CAN, Ethernet, RFFE, I2C, I3C, SPMI or other suitable protocol. In some instances, two or more devices 202, $222_0$-$222_N$ may be configured to operate as a host device on the serial bus 220. In some instances, the apparatus 200 includes multiple serial buses 220, 252a and/or 252b that couple two or more of the devices 202, $222_0$-$222_N$ or one of the devices 202, $222_0$-$222_N$ and a peripheral device such as a display or camera 250. In some examples, one subordinate device $222_0$ is configured to operate as a display or camera coupled to a display or camera 250. The latter subordinate device $222_0$ may include a physical layer circuit 232 that is configured to enable communication with the display or camera 250 over a bus 252.

Figure 3:
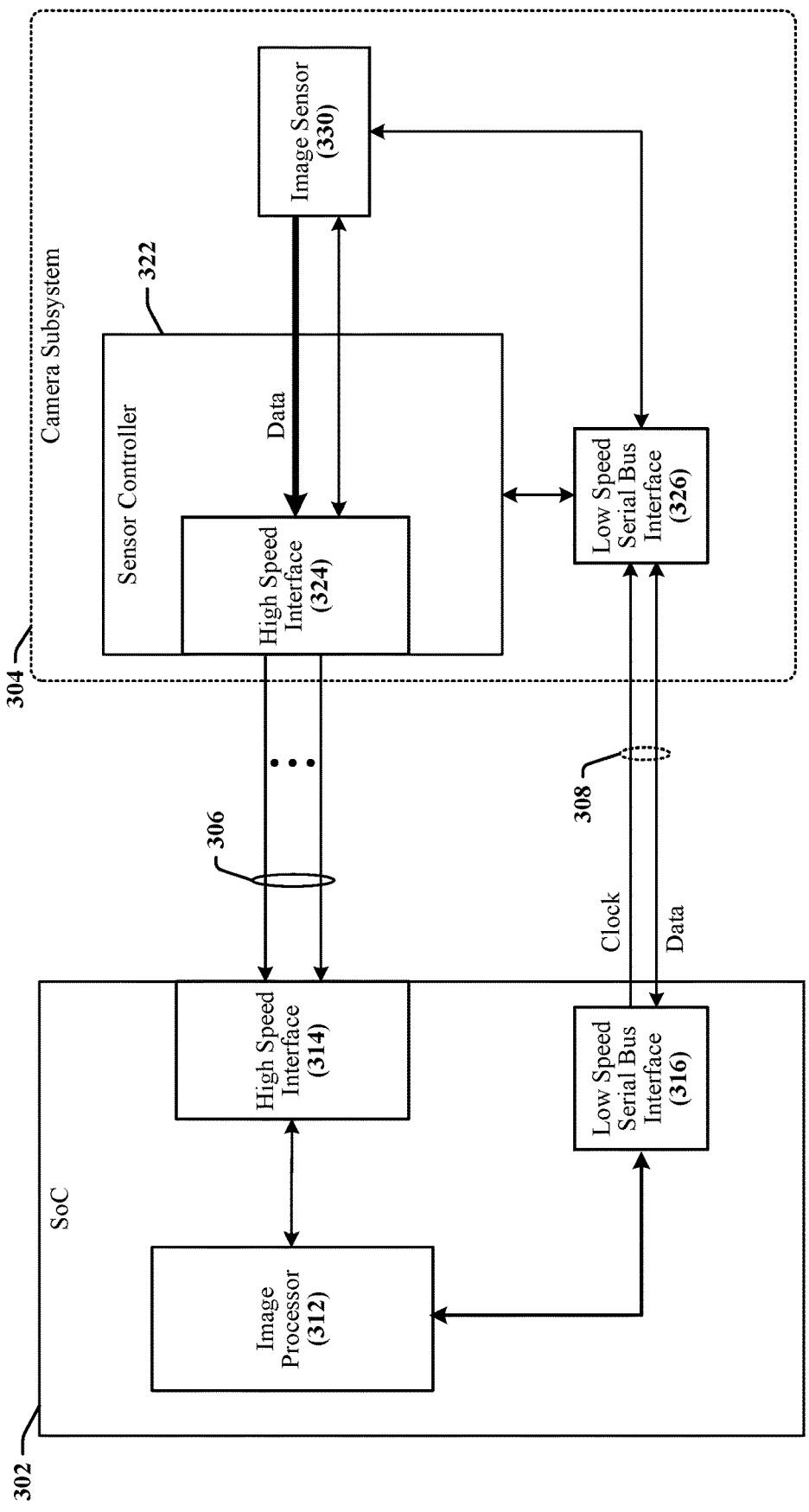
FIG. 3 illustrates a system that includes an imaging device in accordance with certain aspects of this disclosure.

FIG. 3 illustrates a system 300 that includes an imaging device in accordance with certain aspects of this disclosure. The illustrated system 300 includes an SoC 302 and a camera subsystem 304 that are communicatively coupled using a high-speed serial bus 306 and a low-speed serial bus 308. In the illustrated example, the SoC 302 may include multiple processors, including a central processing unit or image processor 312, one or more microcontrollers, digital signal processors, finite state machines or other sequential logic. The SoC 302 also includes a high-speed physical interface circuit 314 and a low-speed physical interface circuit 316. Various types of communication protocols can be used to control or manage high-speed serial data links and low-speed serial data links. One or more serial data links may be aggregated if required to meet performance requirements. The camera subsystem 304 includes in a sensor controller 322 that may be configured to control and configure the operation of an image sensor 330. The sensor controller 322 may include one or more processing circuits including, for example, one or more microcontrollers, digital signal processors, finite state machines or other sequential logic. The sensor controller 322 may include a high-speed physical interface 324 that is coupled to the high-speed serial bus 306 and a low-speed physical interface 326 that is coupled to the low-speed serial bus 308.

Figure 4:
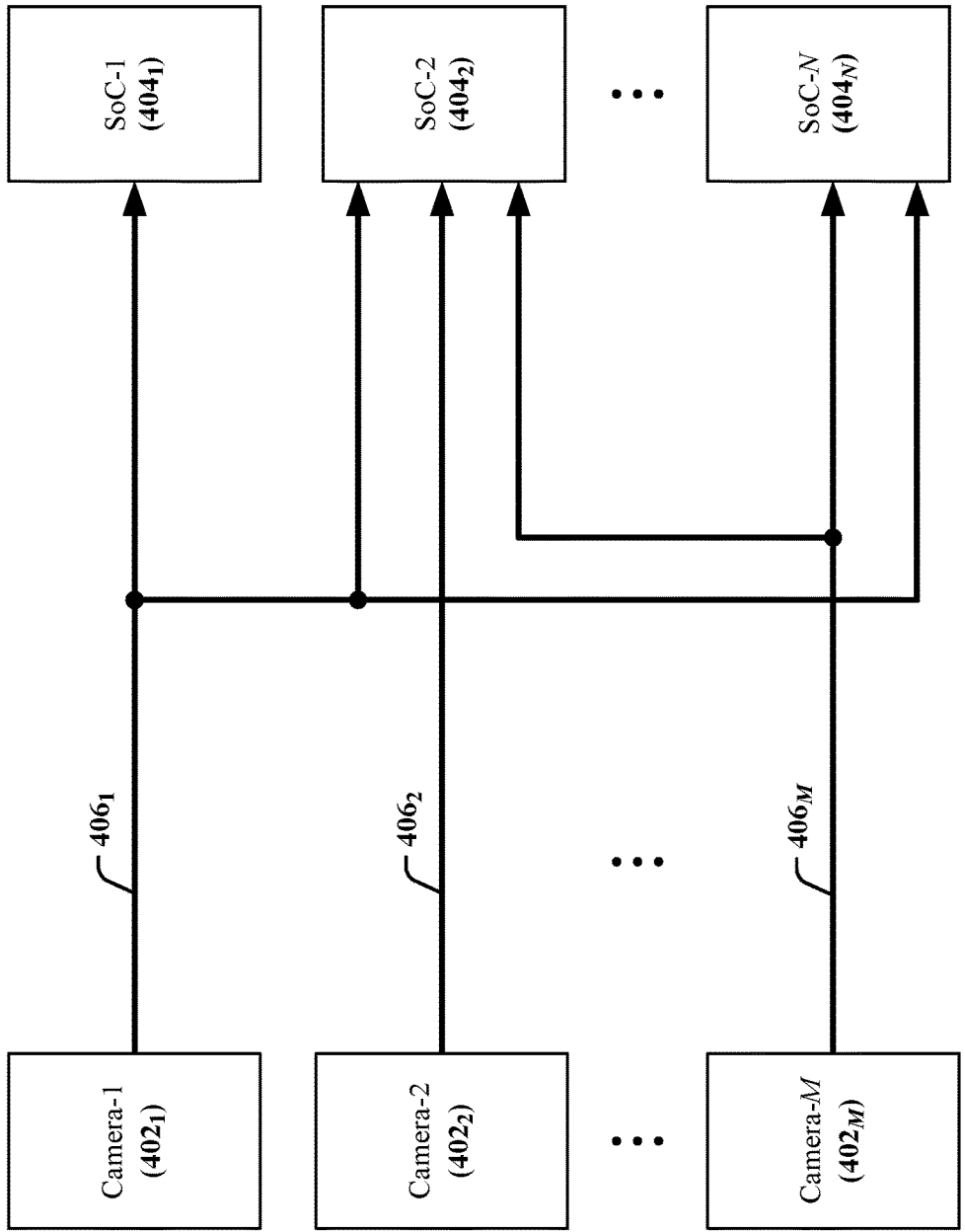
FIG. 4 illustrates a system that may be deployed in certain automotive applications.

FIG. 4 illustrates a system 400 that may be deployed in automotive applications. In the illustrated example, multidrop data links are used to couple multiple cameras $402_1$-$402_M$ to multiple application processors or SoCs $404_1$-$404_N$. In the illustrated example, each camera $402_1$-$402_M$ transmits image data over a corresponding multidrop data link $406_1$-$406_M$. In some instances, one of the cameras $402_1$-$402_M$ may transmit a datastream to one of the SoCs $404_1$-$404_N$ that hosts an application configured to provide assistance to a driver when parking a vehicle, and this camera may be one of several of the SoCs $404_1$-$404_N$ that are used by a guidance system during autonomous operation of a vehicle. In some instances, various cameras $402_1$-$402_M$ may transmit a datastream to one or more of the SoCs $404_1$-$404_N$ that are used for managing vehicle security, including for access control and/or to support anti-theft systems. In some instances, images produced one or more of the cameras $402_1$-$402_M$ can be transmitted concurrently to multiple SoCs $404_1$-$404_N$ or application processors that cooperate to provide redundant autonomous driving capabilities, where each of the SoCs $404_1$-$404_N$ can reliably operate when one or more of the other $404_1$-$404_N$ fail, produce erroneous or invalid results or enter an idle state. The multidrop data links $406_1$-$406_M$ can be used to support these and other implementations in which a single camera $402_1$-$402_M$ can be monitored by multiple SoCs $404_1$-$404_N$. The application processors, SoCs or other video processors that receive a datastream from one or more may be referred to herein as video processing circuits, regardless of whether the application processor, SoCs or other video processors use, modify or operate on the datastream or merely relay the datastream to another device.

Certain aspects of this disclosure relate to cryptographic data protection of image data transmitted over wired or wireless connections. Certain aspects of this disclosure provide systems, apparatus and procedures that can ensure the integrity of transmitted data within constraints defined or specified for an application. In one example, the transmitted data may include image data generated by camera-based systems and/or radar or lidar systems may be transmitted to a controller in an automobile. The constraints associated with data communication systems deployed within an automobile include power consumption and/or thermal management limits.

For the purposes of this disclosure, data protection and/or data security relate to authentication, data integrity and encryption. The identity of users, applications, systems and devices involved in a data communication transaction may be authenticated to establish trust between transmitters and recipients of data. In one example, a transmitter may authenticate a recipient before transmitting data. In another example, mutual authentication of transmitter and receiver is desirable.

For the purposes of this disclosure, data integrity may also be referred to as data or message authentication. Data integrity is implemented to ensure that data exchanges between the central controller 120 and other systems are unaltered during transmission. Data integrity may be accomplished by providing a message authentication code (MAC) with each data packet or transaction. Encryption services are used to protect information, including image and sensor data, from unauthorized access. In certain examples messages transmitted over a data communication link may be encrypted and encapsulated within a datagram, packet or other unit of transmission.

Certain aspects of this disclosure relate to systems that can leverage, adapt or expand data security standards. In one example, the Institute of Electrical and Electronic Engineers (IEEE) 802.1AE MACsec standard defines data security standards that are based on a link-based paradigm. In another example the camera service extensions (CSE) standard promulgated by the MIPI Alliance defines data security standards that are based on an application-based paradigm.

Figure 5:
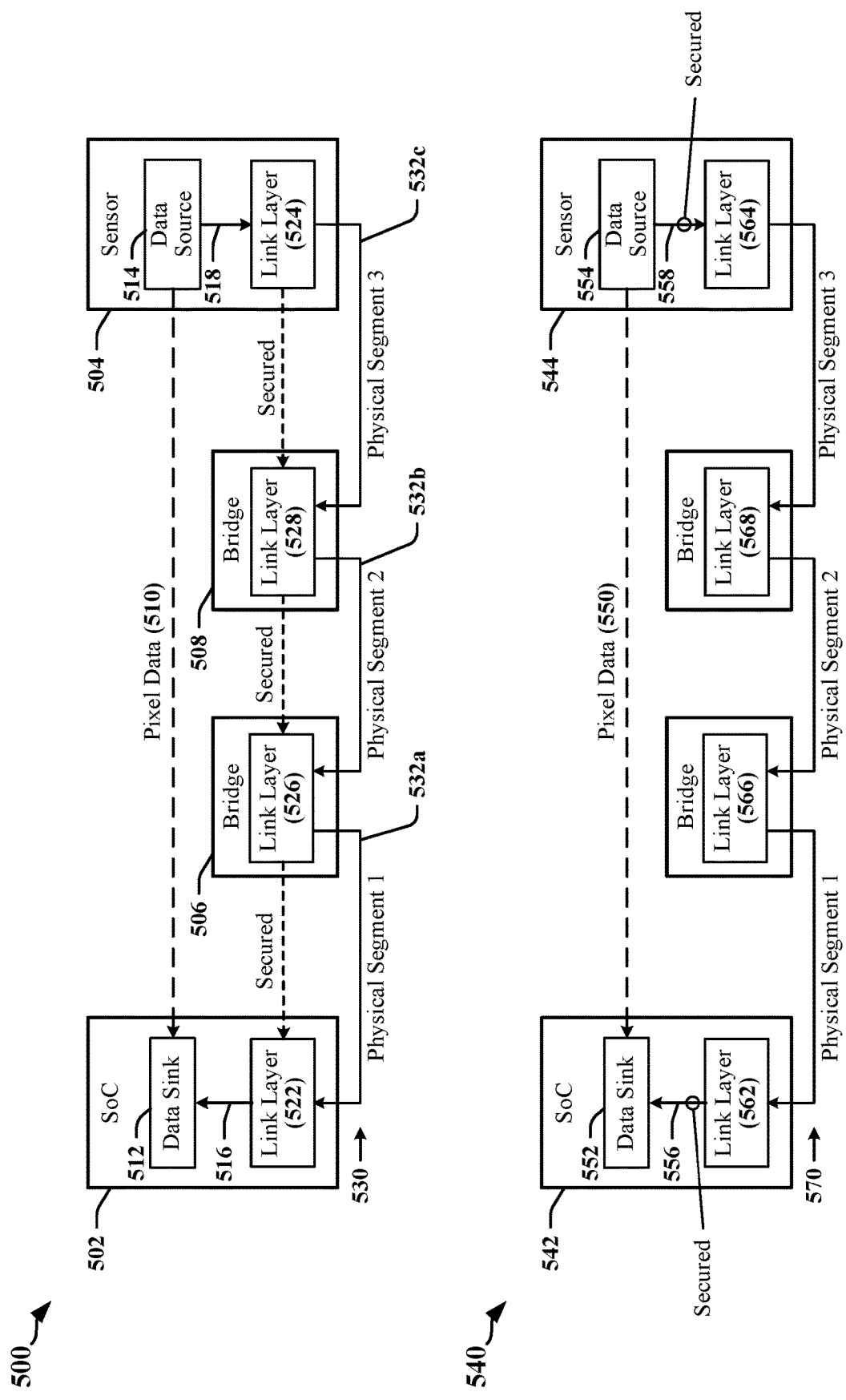
FIG. 5 illustrates examples of data security paradigms that may be adapted in accordance with certain aspects of this disclosure.

FIG. 5 illustrates an example of a link-based data security paradigm and an example of an application-based data security paradigm. In the first illustrated example 500, data security is provided according to a link-based paradigm (Link-Based Security). A data communication link 530 is secured at the lowest protocol layers when Link-Based Security is implemented. Typically, data protection is provided by link layer circuits and modules 522, 524, 526, 528 that may also configure and operate connections between components 502, 504, 506, 508. Data protection procedures are typically executed before physical transmission of data 518. In the illustrated example 500, the data 518 is generated by a sensor control module (data source 514) in a sensor device 504. All data transactions between an SoC 502 and the sensor device 504 are transmitted over a data communication link 530 that is secured using Link-Based Security. In conventional systems, all transactions are secured without exception and no provision is made for selectivity of source or nature of the data traffic. In the illustrated example 500, link layer circuits and modules 522 are responsible for securing data transmitted or received by the SoC 502 and link layer circuits and modules 524 are responsible for securing data transmitted or received by the sensor device 504.

Link-Based Security can reduce the communication overhead at the SoC 502 and at the sensor device 504. For example, applications that receive data from the sensor device 504 or that configure and manage the operation of the sensor device 504 are not required to generate MACs or encrypt data packets. In some systems, the link layer circuits and modules 524 encrypt data transmitted by the sensor device 504 and the link layer circuits and modules 522 decrypt data received by the SoC 502, respectively. An application that serves as a data sink 512 in the SoC need not be aware that data 516 received from the sensor device 504 has been encrypted during transmission, or need not even be aware of the data communication link 530 from which the data 516 has been received.

A virtual data link 510 can be established between the SoC 502 and the sensor device 504 using the data communication link 530. The data communication link 530 may be established using multiple segments 532a, 532b, 532c. When Link-Based Security is employed, the link layer circuits and modules 522 in the SoC 502 are responsible for the first segment 532a of the secured data communication link 530 only, and the sensor device 504 may be involved in securing the last segment 532c. In the illustrated example 500, intervening devices 506, 508 are responsible for securing the segment 532b over which they are connected. In some instances, certain endpoint devices may not comprehend the Link-Based Security and may be connected by unsecured physical segments. For example, the SoC 502 and/or the sensor device 504 in the illustrated example may be endpoint devices that do not comprehend the Link-Based Security, and the corresponding segments 532a and/or 532c may be unsecured by the Link-based Security.

Certain advantages of the link-based paradigm derive from the automatic protection of all data traffic entering the link layer. For example, no cryptographic processing is required at higher protocol layers including in the application layer. In another example, processing circuits associated in the SoC 502 and sensor device 504 are not required to manage, configure or control cryptographic operations for any data communication links other than the first segment 532a or 532c of the data communication link 530 used coupled to the SoC 502 or the sensor device 504, respectively.

In the second illustrated example 540, data security is provided according to an application-based paradigm (App-Based Security). A data communication link 570 is typically secured within the Application layers of the communication protocol when App-Based Security is implemented. Security standards and protocols defined by the MIPI Alliance, for example, define Application layer data security features for data communication links.

In accordance with certain aspects of this disclosure, partial integrity modes of data protection may be applied when an application-based paradigm is employed. The partial integrity modes provide data security with some degree of granularity whereby, for example, only a portion of a video frame is protected. In one example, data originating at one data source 554 is protected while data originating at another data source may be unprotected. In another example, data 558 to be provided to one data sink 552 may be protected while data directed to other data sinks may be unprotected. In another example, certain portions of data 558 originating at a specified data source 554 and directed to a specified data sink 552 may be protected while other data transmitted over the data communication link 570 may be unprotected. Certain data types transmitted over the data communication link 570 may be protected while other data types may be unprotected. Data types may include types of data that may be used to represent or identify the image data itself in a particular format, such formats based on the red-green-blue (RGB) color model or based on the YUV color model in which pixel data is encoded according to luminance (Y) and chrominance (U and V). Certain data types may be used to represent or identify auxiliary or embedded data associated with the image data, such as its data valid or data invalid state or its GPS location.

In accordance with certain aspects of this disclosure, partial integrity modes of data protection enabled under the application-based paradigm can be optimized based on tradeoffs between power consumption and security requirements, providing a system that includes scalable data integrity configurations. In one example, the application-based paradigm enables reductions in power consumption to be realized by limiting cryptographic and other processing operations to specific portions of an image frame or data types, sources and sinks as selected by application or system designers. Certain elements of data security can be provided independently of the underlying transport medium or protocol. For example, data integrity modes implemented under the application-based paradigm enable an application to establish a partially protected data link 550 between an SoC 542 and sensor device 544 that can be used to transmit data over wired and wireless communication links without modifying link layer circuits and modules 562, 564, 566, 568. The partially protected data link 550 can be established without modifying or reconfiguring communication protocols used to manage, configure and control the data communication link 570. Reductions in power consumption accrued from selective and/or scaled protection of data 558, 556 can enable power budgets and thermal budgets to be met. Power budgets and thermal budgets are typically afforded a high priority in embedded systems, battery-operated systems and systems with limited heat dissipation capability. Independence from the underlying transport mechanism enables an application to establish a partially protected data link with another application or controller without regard for the physical layer aspects of the data link (e.g., wired or wireless) or communication protocol used to manage, configure and control the physical data link.

In some systems, the use of the link-based paradigm can improve performance of the overall system or device. In one example, link initialization and authentication for data communication links protected in accordance with the link-based paradigm can be completed more quickly than for data communication links protected in accordance with the application-based paradigm. Multiple segments of a data communication link can be initialized and authenticated concurrently when the link-based paradigm is adopted. An application processor or SoC is typically required to authenticate each component in sequence when a multi-segment and/or multidrop data link is protected in accordance with the application-based paradigm. The sequential authentication may be slowed further by the presence when a slow type of data communication is used to control or manage communication over one or more segments. In one example, I2C-based data communication may be considered to be a slow type of data communication.

Data security may include authentication, integrity and confidentiality components. Authentication relates to the establishment of trust between parties to a transaction. The parties to a transaction may include the transmitter of data and one or more receivers of data. One-way authentication is desired for data communication links to ensure that the receiver (such as the controller) is confident that it trusts the source of the transmitted data (such as the sensor). Mutual or two-way authentication is frequently additionally desired to ensure that the transmitter (such as the sensor) trusts the source of data, such as control data, from the controller. Integrity relates to the assurance that data is unaltered in transit by an "attacker" often referred to as "man in the middle attacker" that intentionally modifies and/or replays the data in transit. In some examples, data integrity may be protected by transmitting a message authentication code (MAC) that can be derived from unaltered transmitted data and that can be used by a receiver to test for disparities between transmitted data and received data. Confidentiality relates to the protection of data content or meaning from unauthorized access. In some implementations, confidentiality protection is obtained through message encryption.

In conventional systems, data security provisions are implemented uniformly for all communication through a data communication link. For example, when enabled, data integrity provisions are typically applied to all data transmitted through a data communication link or, when disabled, to none of the data transmitted through the data communication link. In some instances, some data may be encrypted for transmission over the data communication link while other data is not encrypted. In one example, the MIPI Alliance defines a flexible security paradigm that may be referred to as Source-selective Partial Integrity & Encryption (SSPIE) standards and protocols.

Certain aspects of this disclosure relate to the systems, methods and techniques that provide security modes that are highly "granular" or "selective" and/or "scalable." In one aspect, a system may employ combinations of link-based and application-based security to secure data communication over a single data communication link. In one aspect, a scalable security paradigm is provided that enables partial integrity to be implemented whereby the integrity of certain portions of transmitted data is protected to higher degree than other portions of the transmitted data. In one example, steps are taken to ensure the integrity of a first portion of the transmitted data while a second portion of the transmitted data is not actively protected.

Certain aspects of the disclosure relate to securing the transmission of video or image data. In one aspect different security protections are applied for different portions or partitions of a video frame. In one example, certain portions of data corresponding to a video frame may be transmitted with a MAC that enables detection of loss of data integrity during transmission, and other portions of the data corresponding to the video frame may be transmitted without first generating a corresponding MAC. In another example, certain portions of data corresponding to a video frame may be encrypted before transmission while other portions of the data corresponding to the video frame may be transmitted unencrypted. A MAC mode configured in accordance with this disclosure determines the frequency of computing MACs in the transmitter and of transmitting the MACs. The generation of a MAC and the encryption of data can involve certain computationally intensive procedures. The ability to provide security mode selectivity can reduce power consumption and/or can limit heat generation in system components that are involved in the MAC or cryptographic computations and/or transmissions. Power consumption and heat generation issues can escalate (worsen) at higher camera resolutions and frame rates in some applications.

The implementation of selective security modes in accordance with certain aspects of this disclosure may include source-selective aspects and partial integrity aspects. In the context of video frame or image data transmission and for the purposes of this disclosure, source-selective security refers to the implementation of different levels of security for different portions or partitions of a video frame. Within the selected portions of the frame, partial integrity transmissions may refer to payloads in which the integrity of a selected part of a payload is protected while some portion of the payload is not actively protected. Full integrity transmissions may refer to payloads in which the entire payload is integrity protected. In some implementations, full integrity transmissions may be encrypted. Encryption may be enabled or disabled according to the security mode in operation or the security protections required for a video partition.

Certain aspects of this disclosure provide systems, apparatus and techniques that enable security modes to be selected, configured and adjusted, including via an artificial intelligence (AI) agent to support application and operational needs. Security modes may define a set of security options that can be selected by applications or during system integration or initialization. The example of an automotive context is used to describe various aspects of this disclosure. In the context of an automobile that may equipped with twenty or thirty cameras, large volumes of image data may be transmitted over wired or wireless connections. Cryptographic data protection, such as integrity protection, may be provided for transmissions involving at least some of the cameras and other data protection modes may be provided for transmissions involving other cameras. In some instances, transmissions involving one or more cameras may not be actively protected. Cameras deployed within an automobile may produce video camera, radar or lidar images that are transmitted to a controller, which may be referred to as a central controller or as an electronic control unit or ECU. Data transmissions involving the ECU may be protected using some combination of authentication, data integrity and encryption. Authentication refers to procedures used to establish trust between devices, while data integrity relates to data or message authentication exchanged between devices.

In certain examples, each camera deployed within an automobile may produce image data at a rate that lies between 1 and 10 gigabits per second (1-10 Gbps). In certain vehicle operating modes, the cameras may produce up to 300 Gbps. Transmission. reception and processing of data at such data rates can result in high power consumption and an associated high level of heat generation.

Figure 6:
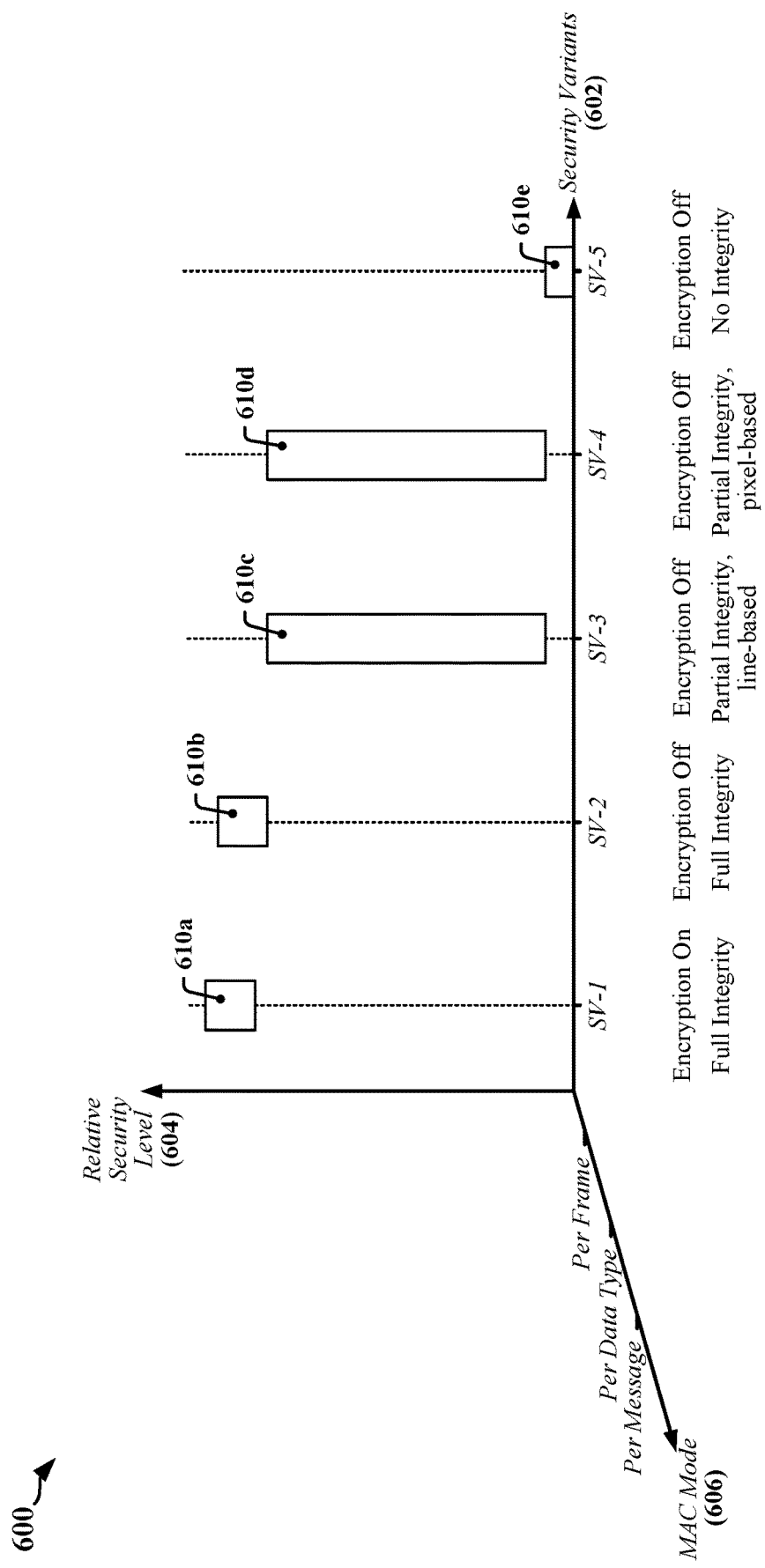
FIG. 6 is a graphical representation of a range of data security modes provided according to a scalable data security scheme implemented in accordance with certain aspects of this disclosure.

FIG. 6 is a graphical representation 600 of a range of data security modes provided according to a scalable data security scheme implemented in accordance with certain aspects of this disclosure. In the illustrated example, five data security variants 602 (x-axis) may select different relative data security levels 604 (y-axis). In other examples the number of defined security variants may be greater or less than five. Different relative data security ranges 610a-610e may be supported or associated with each data security variant 602. Data integrity modes may also be selected as a function of MAC mode 606 (z-axis). The data integrity mode may define whether MACs are calculated per frame, or per selected or identified portions of a frame, per data type or for a complete message that may include metadata, control and/or status information in addition to image data.

According to one aspect of this disclosure, the relative data security level for data transmissions can be selected, or switched according to identified data type, data source, data sink, mode of transmission, available power, temperature constraints and/or mode of operation of a vehicle or system in which the transmitted data is generated or processed. The data security levels 604 may be selected or configured by an ECU or other controller that monitors or defines vehicle modes of operation or that is responsible for power consumption, thermal management and/or safety and physical security of the vehicle and occupants. Data security levels 604 may be selected or configured by an AI agent that resides in an ECU, controller or SoC.

In the illustrated example, the ECU or other controller may configure a data security level 604 for transactions between an application and a sensor or peripheral, and/or for one or more physical data communication links within a vehicle or system by selecting a data security variant 602. A level of security available for the data security variant 602 and a MAC mode 606 may also be configured by the ECU or other controller. In some instances, data communication links may be grouped by function and/or by modes of operation of a vehicle. In some examples, two or more data communication links can offer the same level of data protection when a vehicle is configured for a first mode of operation and operate with levels of data protection that are different from one another when the vehicle is configured for a second mode of operation.

In some implementations, the ECU or other controller references one or more look up tables to determine the data security level 604 to be configured or selected for a transaction or data link. In some implementations, the ECU or other controller may determine data security levels based on an analysis of sensor readings, vehicle operational status, environmental conditions, battery or fuel levels and other parameters. In one example, the analysis may include contributions by an AI agent or other machine learning algorithm. In the latter case, the AI agent may operate in phases known in the practice of AI, including an AI training phase performed using controlled data sets such as based on measurements of power and/or heat based on operating conditions, followed by an AI feedback phase performed on-the-go or periodically with the help of real-time system feedback, followed by an "inference" or "prediction" phase where next-step system configurations are identified.

In the illustrated example, the five data security variants 602 may be used to select partial integrity modes that provide levels of protection ranging from a maximum data integrity mode with data encryption to a minimum integrity mode that offers no additional data integrity beyond the data protection that may be provided by data communication link management protocols. Data exchanges conducted under a first security variant (SV-1) may offer maximum data security for each MAC mode 606 with data encryption and full data integrity protection enabled. Data integrity may be applied per frame, per data type or per message in accordance with a selected MAC mode 606. Data encryption is disabled under the other four security variants (SV-2, SV-3, SV-4 and SV-5). Under the second security variant (SV-2), full data integrity protection is enabled and applied per frame, per data type or per message in accordance with a selected MAC mode 606. No additional data integrity protection is provided under the fifth security variant (SV-5), and two modes of partial data integrity protection are provided under the third and fourth security variants (SV-3 and SV-4). The partial data integrity protection modes may be characterized by stride patterns which define the portions of data transmissions that are provided increased or decreased relative data integrity protection.

Figure 7:
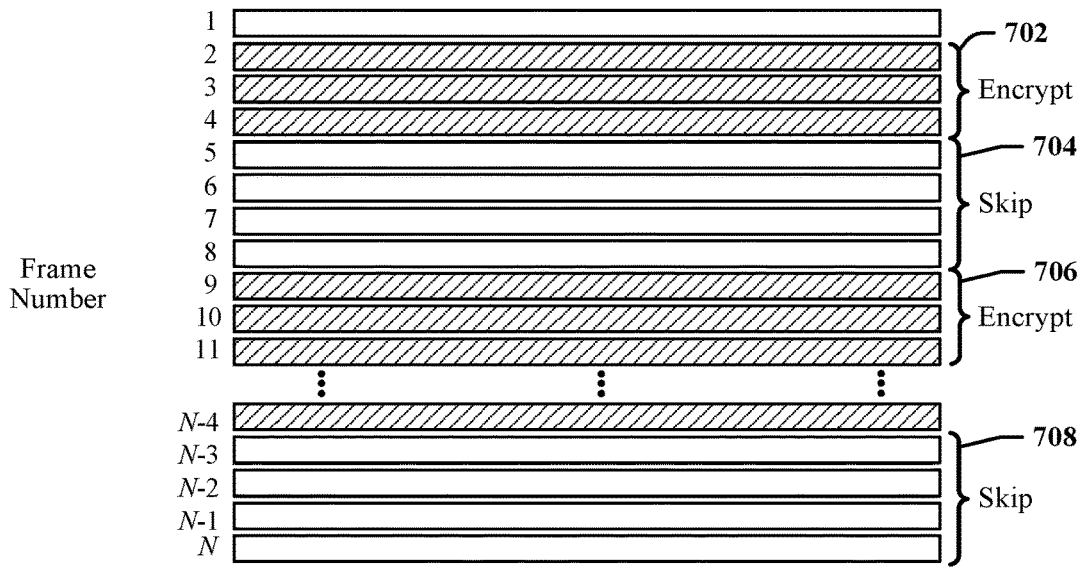
FIG. 7 illustrates certain examples of stride patterns that may be configured in accordance with certain aspects of this disclosure.
Figure 7:
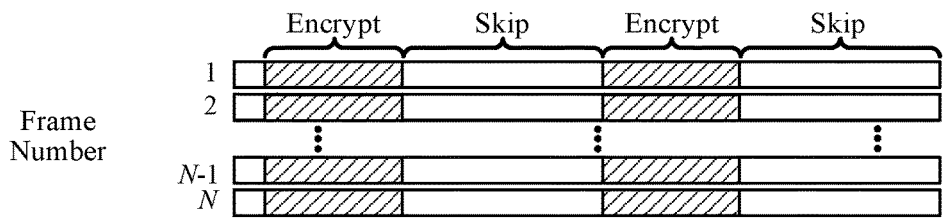
Figure 7:
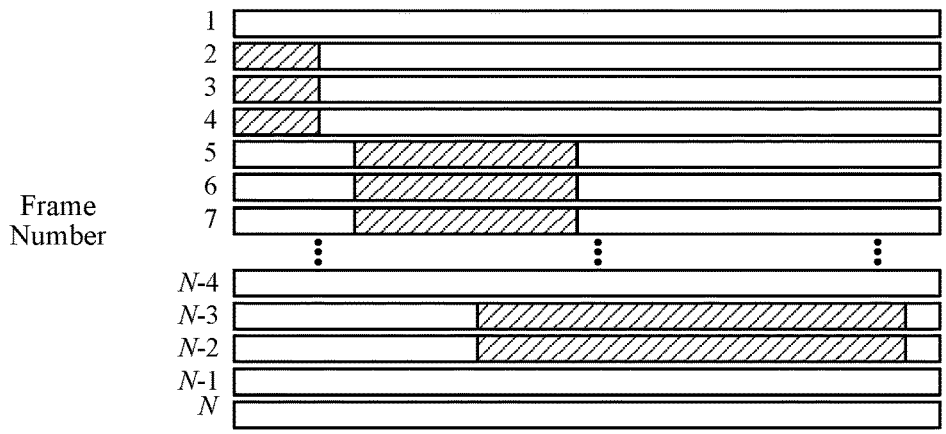

FIG. 7 illustrates examples of stride patterns that may be configured in accordance with certain aspects of this disclosure. A first stride pattern 700 may be applied to image data on a line-by-line basis. The image data may include pixel data and be transmitted in a sequence of data packets with other data and command codes. For the purposes of this disclosure, a line refers to a quantity of image data that represents a horizontal line in an image captured by a sensor. In other examples, the line can refer to a quantity of image data representing a row in an image captured by a sensor. For each line, data integrity protection is applied to all of the image data or to none of the image data. The stride pattern 700 defines the combination and arrangement of the lines to which data integrity protection is applied. In some implementations, the stride pattern 700 is symmetrical with a determinable cadence. The stride pattern 700 may be considered symmetrical when data integrity protection line is consistently applied to groups of lines 702, 706 that include the same number of lines and that are followed by groups of unprotected lines 704, 708 that include a minimum number of lines. The stride pattern 700 may be considered to have a determinable cadence when data integrity protection line is applied at fixed intervals through the frame and/or associated or embedded data. In some instances, an irregular stride pattern may be defined in which data integrity protection is applied to specified or selected lines or groups of lines that include image data within a frame and/or selected lines or groups of lines that include metadata or embedded data.

A second stride pattern 720 may be applied to image data on a pixel-by-pixel basis within one or more lines or within one or more vertical blocks of pixel data within the image data frame. A block of pixel data may include contiguous data that occupies a portion of one or more lines. In some examples, a block of pixel data may correspond to a vertical or horizontal line of pixels, including when lines and portions of lines may be included in the stride pattern 720. In some examples, a randomized stride pattern 730 is applied to protect the integrity of a region of interest (RoI) or an arbitrarily selected block of pixel data. The stride pattern 720, 730 defines the size and location of blocks of pixels to which data integrity protection is applied. In some implementations, the stride pattern 720, 730 is symmetrical with a determinable cadence. The stride pattern 720, 730 may be considered symmetrical when data integrity protection line is applied to data corresponding to multiple blocks of pixels that have the same size and shape and that are located throughout the image data and/or metadata or embedded data. The stride pattern 720, 730 may be considered to have a determinable cadence when data integrity protection is applied at fixed intervals through the image data and/or metadata or embedded data. In some instances, an irregular stride pattern may be defined in which data integrity protection is applied to blocks of image data of various sizes and/or with no discernible repetitive pattern within an image frame.

In some implementations, a transaction that involves the transmission of an image frame may include defined frame partitions that include data packets that carry command and control sequences, portions of the image data, and/or metadata or embedded data. A stride pattern may be independently defined for each frame partition within a frame. For the purposes of this description, the structure of the transaction and associated data packets may be defined by a data communication protocol.

Figure 8:
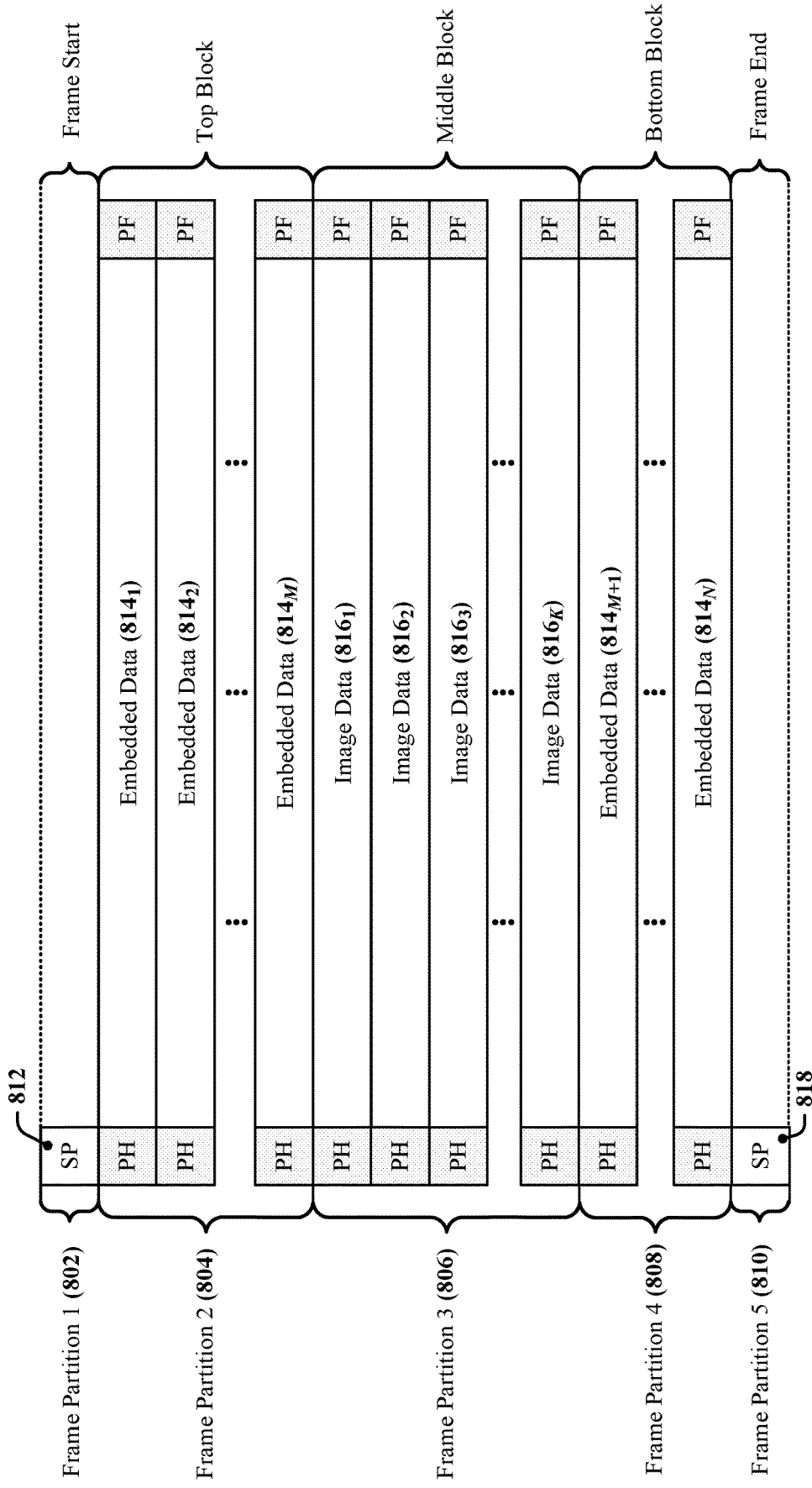
FIG. 8 illustrates an example of a frame-related transaction that is partitioned in accordance with certain aspects of this disclosure.

FIG. 8 illustrates an example of a frame-related transaction 800 that is partitioned in accordance with certain aspects of this disclosure. The frame-related transaction 800 may include the transmission of data packets configured in accordance with a standards-based or proprietary protocol. One example of a standards-based protocol is the CSI-2 protocol defined by the MIPI Alliance. A first frame partition 802 includes at least one short packet 812 that indicates a start of the frame-related transaction 800. The short packet 812 may include parameters that define certain aspects of the structure of the frame-related transaction 800. A second frame partition 804 includes one or more packets $814_1$-$814_M$ that carry first embedded data associated with an image frame. The embedded data may include information that defines certain features of a captured image, including size, resolution, aperture and focus settings and other image-related information. A third frame partition 806 includes one or more packets $816_1$-$816_K$ that carry image data. The image data may include one or more bytes of data for each pixel in the image frame. A fourth frame partition 805 includes one or more packets $814_{M+1}$-$814_N$ that carry second embedded data associated with an image frame. A fifth frame partition 810 includes at least one short packet 818 that indicates the end of the frame transmission. The embedded data may include information that identifies the timing of capture of the image or a sequence number of the image. In some implementations, the embedded data may include data integrity information, including information related to stride patterns associated with image data transmitted in the frame-related transaction 800.

Figure 9:
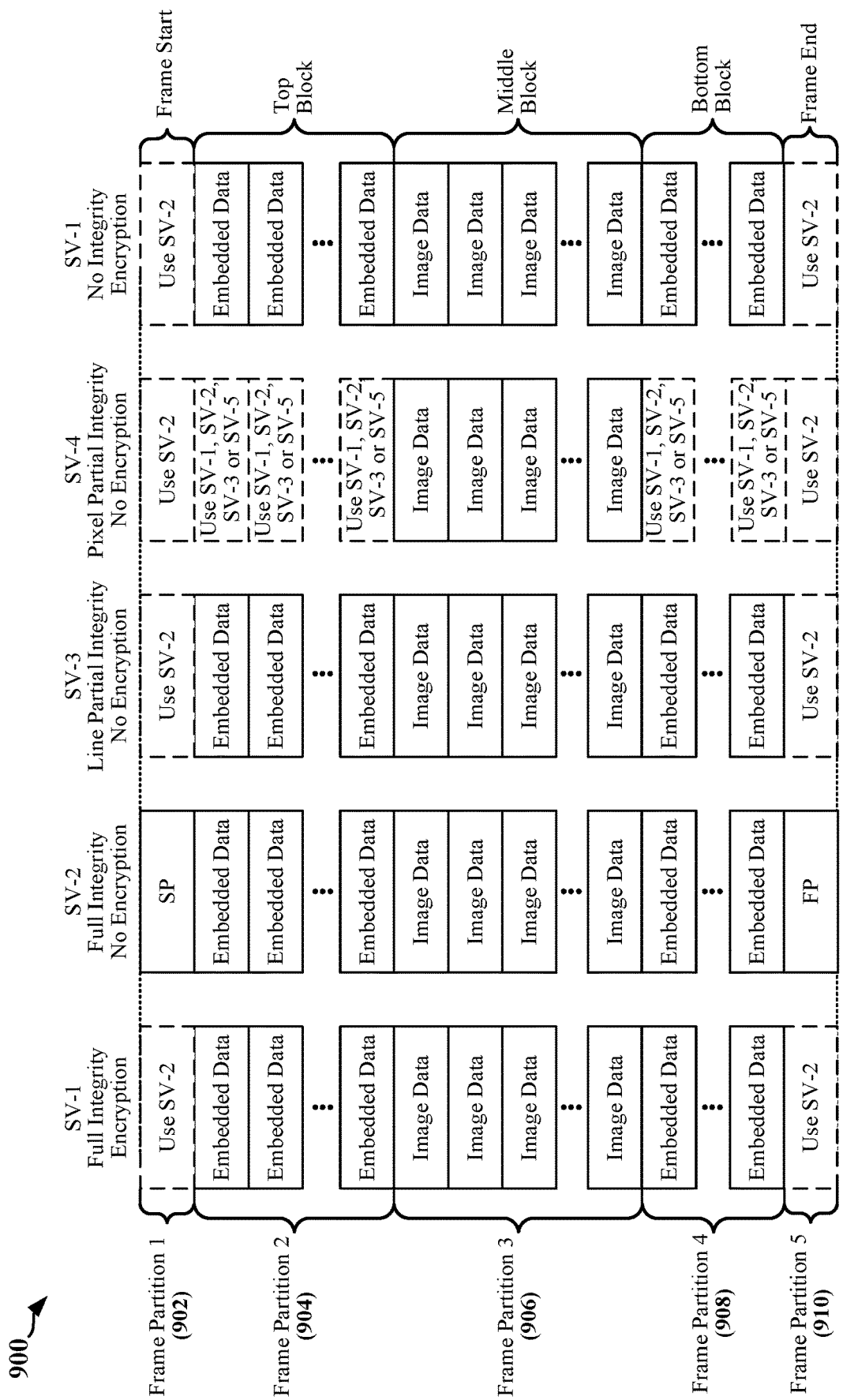
FIG. 9 illustrates one example of a scalable data security scheme applied to frame partitions in accordance with certain aspects of this disclosure.

FIG. 9 illustrates one example of a scalable data security scheme 900 that can be selectively applied to frame partitions 902, 904, 906, 908, 910 in a frame-related transaction conducted in accordance with certain aspects of this disclosure. A range of data security modes may be implemented for use with packets carrying command control information, image data, embedded data and other information. The frame partitions 902, 904, 906, 908, 910 may correspond to the frame partitions 802, 804, 806, 808, 810 illustrated in FIG. 8 and the security variants (SV-1, SV-2, SV-3, SV-4 and SV-5) may correspond to the data security variants 602 illustrated in FIG. 6. Certain aspects of the scalable data security scheme 900 may correspond to features of a standards-based protocol, although the concepts illustrated in FIG. 9 are not limited to any particular protocol or standard.

In the illustrated data security scheme 900, the short packets transmitted in the first frame partition 902 and the fifth frame partition 910 are provided in all frame-related transactions with full-integrity data protection, with no encryption. This level of data protection corresponds to the data protection provided under the SV-2 security variant. Embedded data transmitted in the second frame partition 904 or in the fourth frame partition 908 can be protected in accordance with any of the security variants except for the SV-4 variant that provides the second stride pattern 720 illustrated in FIG. 7, which is applied to image data on a pixel-by-pixel basis, to blocks of pixel data within the image data or to regions of interest in an image. Embedded data may be transmitted with full-integrity data protection with or without encryption (SV-1 and SV-2), with no integrity data protection with no encryption (SV-5), or with line based partial integrity data protection with no encryption (SV-3). The data protection mode configured for embedded data transmitted in the second frame partition 904 may be different from the data protection mode configured for embedded data transmitted in the fourth frame partition 908.

Image data transmitted in the third frame partition 906 can be protected in accordance with any of the security variants (SV-1, SV-2, SV-3, SV-4 or SV-5), and may have full-integrity data protection with or without encryption, no integrity data protection with no encryption or partial integrity data protection with no encryption.

Certain aspects of this disclosure enable an AI processor, ECU or other controller provided in a vehicle to select between a link-based security mode and an application-based security modes for the exchange of image data, sensor data and other types of information generated and/or consumed within a vehicle. The ECU or other controller may also switch between security modes as conditions or context changes. In one example, changes in power, thermal and security limitations or requirements can prompt a switch between security modes. In another example, changes in driving modes, road conditions or road type can prompt a switch between security modes.

Link-based security modes can limit processing and computational overhead in application processors, the ECU and/or another controller. Link-based security is handled by link layer modules and circuits and some additional delay may be expected for link establishment when security for multiple segments of a data communication link must be independently established. The relative simplicity of operating link-based security modes can lead to a loss of flexibility in comparison to application-based security modes. For example, link-based security modes are typically limited to the alternatives of full security for all data flowing through the link layer, or no security flowing through the link layer. Application-based security modes can increase processing and computational overhead in comparison to link-based security modes. Application processors, the ECU and/or other controllers that handle encryption or MAC computation are subjected to high processing overhead and consequently increased power consumption and heat generation when application-based security is enabled or implemented. These increased burdens can be reduced by tradeoffs between relative security level, quantity of cryptographic computations, power consumption, thermal management limits, and other capabilities or features. In accordance with certain aspects of this disclosure, partial integrity modes implemented in application-based security modes can provide a data security granularity that can facilitate tradeoffs between minimum security requirements, power and thermal budgets and processing capacity.

An application processor, ECU or other controller may establish a connection with a sensor or camera over a physical data communication link. The application processor experiences greater processing overhead when application-based security is enabled than when link-based security is enabled. From the perspective of an application being executed on the application processor, the connection comprises a virtual data link and the topology of the underlying physical data communication link, intermediaries such as bridges and communication protocols need not be explicitly known. An application that requests or establishes a virtual link need not be aware of the security mode employed to protect data communication over the physical data communication link and application-transparent switches between security modes can be facilitated in systems configured or adapted in accordance with certain aspects of this disclosure.

It can be expected that, at any time, some cameras in an automobile or other vehicle may be in different operational states than other cameras and that image data produced by some cameras may be protected using a link-based data security mode while image data produced by other cameras may be protected using an application-based data security mode. A camera may switch between operational states when the driving context of an automobile changes, when a component of the vehicle control system approaches power, thermal, computational capacity or other limits, or when an image processor detects a high-value scene in image data generated by the camera. A change in operational state of the camera may trigger a need for increased data security or may present an opportunity to reduce data security in order to alleviate operational stresses associated with other cameras.

In one example, a system may default to a link-based security mode to protect all traffic after system initialization or when idle, and may switch to an application-based security mode to address a power constraint. Partial integrity may be configured in an application-based security mode to enable a tradeoff between power consumption and a specified minimum data protection level. In another example, the system may be operating in an application-based security mode in order to remain within a system's fixed capacity for security computations (e.g., 100 Gbps) when a demand for security computations increases following activation of a previously idle camera. The previously idle camera may be activated to capture high-value scenes that require full integrity and/or encryption for transmission over a data communication link. In this example, the data communication link may be switched to a link-based security mode. One or more other data communication links or camera subsystems may be switched from link-based security mode to an application-based security mode or to a lower-integrity application-based security mode as part of a tradeoff necessitated by the activation of the previously idle camera.

In accordance with certain aspects of this disclosure, one or more cameras in an automobile may switch between data security modes during initialization. In some implementations, a camera or imaging device that has been powered-on or reset may be initialized through a bootstrap procedure to communicate according to a link-based data security mode. A link-based data security mode may be initialized in significantly less time than an application-based data security mode. The resultant "fast-boot initialization" can allow the camera to become fully functional in a short period of time and can later be switched to an application-based data security mode as needed or desired.

In one example, a central controller and certain system components may be configured a priori to use fast-boot initialization. In another example, the central controller and the system components determine in real-time that fast-boot initialization is desired. Upon completion or partial completion of a fast-boot initialization, the central controller is configured for link-based data security mode and begins monitoring for a triggering event that indicates a change in security mode and may determine an application-based data security mode to be used in response to the triggering event. The central controller may exit the link-based data security mode and enter an application-based data security mode.

In accordance with certain aspects of this disclosure, one or more cameras in an automobile may switch between data security modes in response to a triggering event that indicates a request, command or requirement to reduce power consumption or heat generation. In some instances, this triggering event may cause the central controller to exit a link-based data security mode and enter an application-based data security mode configured to mitigate power consumption and/or thermal issues. In some instances, encryption may be discontinued. In some instances, an application-based data security mode is already in effect and the central controller may modify partial integrity settings for the active application-based data security mode. For example, the central controller may modify the stride pattern for the active application-based data security mode in order to reduce data protection (integrity) computations.

In accordance with certain aspects of this disclosure, one or more cameras in an automobile may switch between data security modes in response to a triggering event that indicates a change in the scene captured by an imaging device or camera. In one example, the triggering event relates to a change from an actively changing or moving scene to a static scene. In this example, the central controller may configure a reduced relative security level by initiating an exit from a link-based data security mode and an entry into an application-based data security mode. In some instances, encryption may be discontinued. In some instances, an application-based data security mode is already in effect and the central controller may modify partial integrity settings for the active application-based data security mode. For example, the central controller may modify the stride pattern for the active application-based data security mode in order to reduce data protection (integrity) computations.

In some implementations, the triggering event is generated when the system determines that the scene captured by a camera has fallen below a spatial or temporal dynamic threshold that does not require full cryptographic protection provided by the link layer. A central controller or other processor may configure a partial integrity mode of data protection to be used after switching from a link-based data security mode to an application-based data security mode. For example, the central controller or other processor may configure a stride pattern to be used in the application-based data security mode and may turn off encryption.

In another example, the triggering event relates to a change from a static scene to an actively changing or moving scene. In this example, the central controller may initiate an exit from an application-based data security mode and an entry into a link-based data security mode. In this example, the transition between security modes may be dependent on available processing and computational capacity and available headroom in the power and thermal budgets that permits increased power consumption and/or heat generation. In some implementations, the physical wiring topology that connects components in the automobile may result in a switch between link-based data and application-based data security modes being applied to multiple cameras. For example, a triggering event may be generated when one camera in a group of cameras detects a change in motion based on spatial or temporal dynamic thresholds. Any changes in data security mode based on the triggering event may be configured based on the impact the change will have on all cameras in the group of cameras.

In accordance with certain aspects of this disclosure, one or more cameras in an automobile may be switched between data security modes to accommodate demands for processing and computational capacity of the system related to data security modes, referred to herein as system security capacity or system processing capacity. Increased demand on system security capacity may result from a response to a triggering event affecting an imaging device or camera. System security capacity is limited and typically fixed to a maximum capacity. For example, the maximum system security capacity may be defined by a total instantaneous capacity.

In an example where a maximum system security capacity of 100 Gbps is available within a system, the aggregate processing and computational consumption for data security operations for all cameras in the system cannot exceed 100 Gbps. Any excess processing or computational capacity demanded by an affected imaging device or camera must typically be offset by changing the data security mode applied to one or more other imaging devices or cameras that are not directly affected by the response to the triggering event. In some instances, the central controller or another processor may change the data security mode applied to one or more other imaging devices or cameras that are not directly affected by the response to the triggering event from a link-based data security mode to an application-based data security mode with a stride pattern calculated, estimated or otherwise expected to reduce data protection computations.

The central controller or another processor may evaluate the available options, including link-based and application-based data security modes that provide full integrity. In some instances, the central controller may determine that the link-based, full integrity option offers the better selection. The link-based data security mode may be associated with minimal or no power or thermal constraints, a reduction in security processing and/or distribution of security processing expected of the application processor in the central controller or in an SoC.

In some instances, the central controller may determine that the application-based, full integrity option offers the optimal selection. In some instances, the central controller may change the data security mode applied to one or more other imaging devices or cameras when limited system security capacity is available. The central controller may change the data security mode applied to one or more other imaging devices or cameras by lowering the corresponding partial integrity level.

System security capacity is frequently considered when changes in external conditions dictate a switch from link-based data security mode to application-based data security mode or from application-based data security mode to link-based data security mode. In one example, a change in external conditions may be indicated when an image processor identifies the presence of a higher-value scene. The higher-value scene may involve the proximity of a child or cyclist to the automobile. The higher-value scene may require the implementation of increased or full integrity data protection, and in some instances may involve a switch from application-based data security mode to link-based data security mode. The central controller may determine that the security characteristics of one or more cameras may be lowered by applying or modifying reduced partial integrity, for example. The central controller may change the data security mode applied to the other cameras by lowering the corresponding partial integrity levels. The central controller may determine remaining system security capacity and/or calculate or estimate security processing capacity available to modify the data security mode of the camera associated with the higher-value scene. The central controller may reduce the security characteristics of other cameras further as needed. The central controller may initiate a switch of data security mode to obtain high integrity data communications for the high-value scene or scene portion.

Certain aspects of this disclosure enable an ECU or other controller provided in a vehicle to switch between that a switch between data protection modes is to be initiated and to determine which data protection mode is to be selected when a switch between data protection modes is indicated. A system configured or adapted in accordance with certain aspects of this disclosure can enable data encryption at the link layer and, in some instances, at application layers of a communication protocol used by an application processor, ECU, SoC and/or a sensor device. A system configured or adapted in accordance with certain aspects of this disclosure can configure and manage data integrity modes, including selecting and configuring partial integrity modes. The ECU or other controller that manages vehicle operations can also configure and initiate data protection modes for multiple data communication links and can initiate changes of data protection modes in devices coupled to the data communication links. The ECU or other controller may select data protection modes based on types and combinations of data to be communicated source and destination of data to be communicated, power and thermal budgets. The ECU or other controller may switch between data protection modes based on changes in power consumption, heat generation and dissipation and other operational conditions. The ECU or other controller may switch between data protection modes in response to changes of modes of operation of the vehicle.

According to certain aspects of this disclosure, an ECU or other controller provided in a vehicle may be configured to weigh competing operational priorities when selecting or switching between data protection modes. In some examples, the ECU or other controller may determine a data protection mode to be implemented based on tradeoffs between operational parameters such as desired or specified relative security level, cryptographic computations needed to implement the desired or specified relative security level, expected power consumption associated with performance of the cryptographic computations, a power budget, expected thermal impact of performing the cryptographic computations and a thermal budget. In some instances, the ECU or other controller is configured to apply weight or priority to the operational parameters and to conform to limits and thresholds defined by system specifications. In some implementations, tradeoffs between hardwired functionality, power consumption and silicon real-estate are made during the design of IC devices that include the ECU or other controller, and the ECU or other controller may distribute certain functions throughout the vehicle according to power or thermal efficiency attributable to different IC devices.

Figure 10:
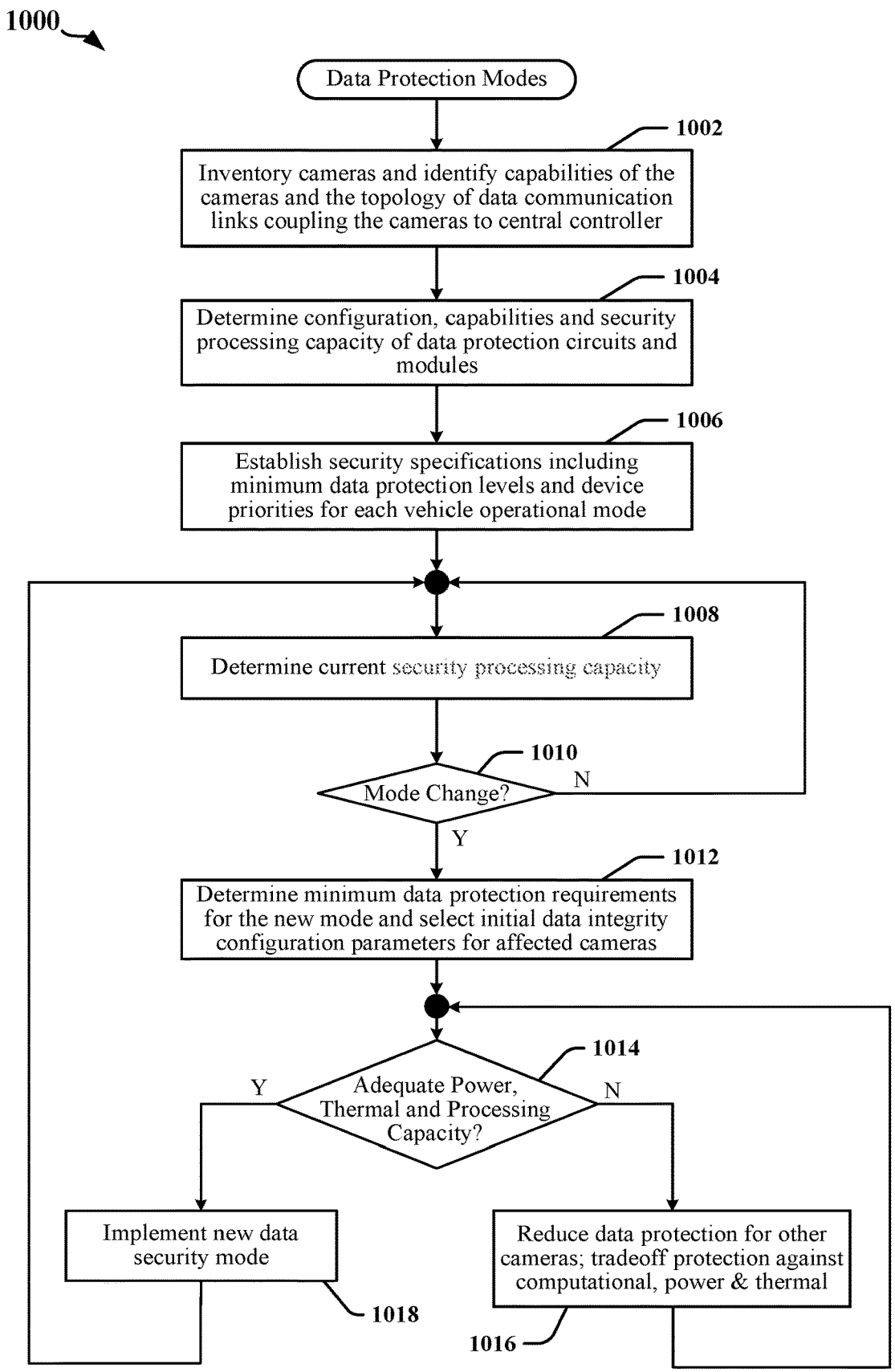
FIG. 10 is a flowchart illustrating security variant mode switching according to certain aspects of this disclosure.

FIG. 10 is a flowchart 1000 illustrating security variant mode switching according to certain aspects of this disclosure. Security variant mode switching may be executed by a central controller configured to implement and manage a scalable data security scheme provided in accordance with certain aspects of this disclosure. The central controller may be an ECU, and SoC or other processing circuit deployed as part of a vehicle control or management system. The central controller may initialize the vehicle control or management system after a power on or reset event. In some instances, the central controller may initialize the vehicle control or management system in response to a command received from an application. At block 1002, and during initialization, the central controller may enumerate and inventory cameras that are provided as part of the vehicle control or management system. The cameras may include different types of camera, each configured to provide data to an image processor that participates in at least one vehicle control or management function. The central controller may identify the capabilities and location of each of the cameras. The capabilities of each camera may be characterized by the supported image sizes, image resolutions expressed as a number and density of pixels, color depth and frame rates. The central controller may further determine the topology of a network by which it is couple to the cameras. The network may include some combination of point-to-point and multidrop data links. One or more cameras may be coupled to the central controller over multiple data links or segments of data links and through one or more bridges or gateways.

At block 1004, and during initialization, the central controller may determine the configuration, capabilities and security processing capacity of various data protection controllers, processors, circuits and modules. The data protection components may be embodied in one or more SoCs and may include the central controller. Certain data protection components may be embodied in link layer circuits and may include data encryption circuits. The processing capacity of a data protection component may be expressed as a number of bytes or pixels that can be processed per second. One or more bytes of data may be required to fully represent a single pixel.

At block 1006, and during initialization, the central controller may establish security specifications for the vehicle control or management system. The security specifications may define minimum data protection levels for each data communication link and/or segment. The security specifications may define minimum data protection levels for each type of data communicated over a data communication link. The security specifications may define minimum data protection levels for data generated by each camera, including as a function of identified operating camera configurations such as a set of front-facing cameras and as a function of operating vehicle mode such as driving above a threshold speed. The security specifications may define minimum data protection levels for each mode of operation of the vehicle and/or for each mode of operation of each camera. The security specifications may define priorities for each camera or for a group of cameras. The security specifications may define priorities for each data link in each mode of operation of the vehicle. Each data protection level may be expressed as a relative security level (RSL). In some implementations, the security specifications may be recorded in an AI function that relates minimum data protection levels and priorities to modes of operation of the vehicle and/or modes of operation of each camera. In some implementations, the security specifications may be recorded in one or more LUTs that relate minimum data protection levels and priorities to modes of operation of the vehicle and/or modes of operation of each camera. The LUTs may account for operational parameters, including power consumption, processing capacity and thermal conditions within the vehicle or within the vehicle control or management system. Processing capability may be expressed as a number of number of pixels that can be handled during integrity computation. Processing capability may be expressed as a number of CSI-2 messages that can be handled during integrity computation. The LUTs may be preconfigured during system integration based on design or simulations.

The RSL coverage selected for a data communication link or type of image data transaction can impact the operational parameters, including processing overhead, power consumption and temperatures over time. At block 1008, the central controller may monitor the operational parameters and may trigger a change in data protection mode to counteract the effects of observed or expected increased temperature or power consumption on system security capacity. System security capacity can change dynamically. Changes in operating mode or changes in power and/or thermal constraints can affect the system security capacity. Switching a data communication link from an application-based security mode to a link-based security mode can increase system security capacity by reducing processing and computational overhead in application processors. Switching a data communication link from a link-based security mode to an application-based security mode can decrease system security capacity, but the reduction can be offset through the use of certain stride patterns, for example.

At block 1010, the central controller determines whether a change in security mode is to be made. When no change is to be triggered then the central controller may loop back to block 1008. When a change in security mode is required, then at block 1012, the central controller may determine the minimum data protection requirements for the new security mode and may select initial data integrity configuration parameters for affected cameras. The central controller determines whether security mode is to be changed to a link-based security mode or to an application-based security mode. The new security mode may be configured for one or more data communication links and/or for one or more cameras. The central controller may determine the security processing capacity of affected data protection components to ensure that sufficient capacity is available to handle the new data protection mode. In one example described herein, the vehicle control or management system has the capacity to handle a total of 100 Gbps of image-related data. In some instances, the capacity of individual data protection components may be limited even when overall capacity is nominally sufficient to handle the new data protection mode.

At block 1014, the central controller determines whether sufficient system security capacity is available to handle the new data security mode. When the vehicle control or management system and affected components of the vehicle control or management system are nominally capable of handling the new data security mode, then the central controller may implement the new data security mode at block 1018 and resumes monitoring at block 1008. When the vehicle control or management system or an affected component of the vehicle control or management system is determined to be incapable of handling the new data protection mode, then the central controller proceeds to block 1016. At block 1016, the central controller may modify the data security mode or data protection setting for one or more other data communication links in order to increase system security capacity. In one example, the central controller may modify the partial integrity mode or partial integrity settings associated with image data generated by one or more lower-priority cameras or communicated over one or more lower-priority data communication links. The partial integrity settings may include a stride pattern associated with image data generated by one or more cameras or communicated over one or more data communication links.

The central controller may return to block 1014 to determine whether the modified data protection mode can be handled by the vehicle control or management system and affected components of the vehicle control or management system.

Examples of Processing Circuits and Methods

Figure 11:
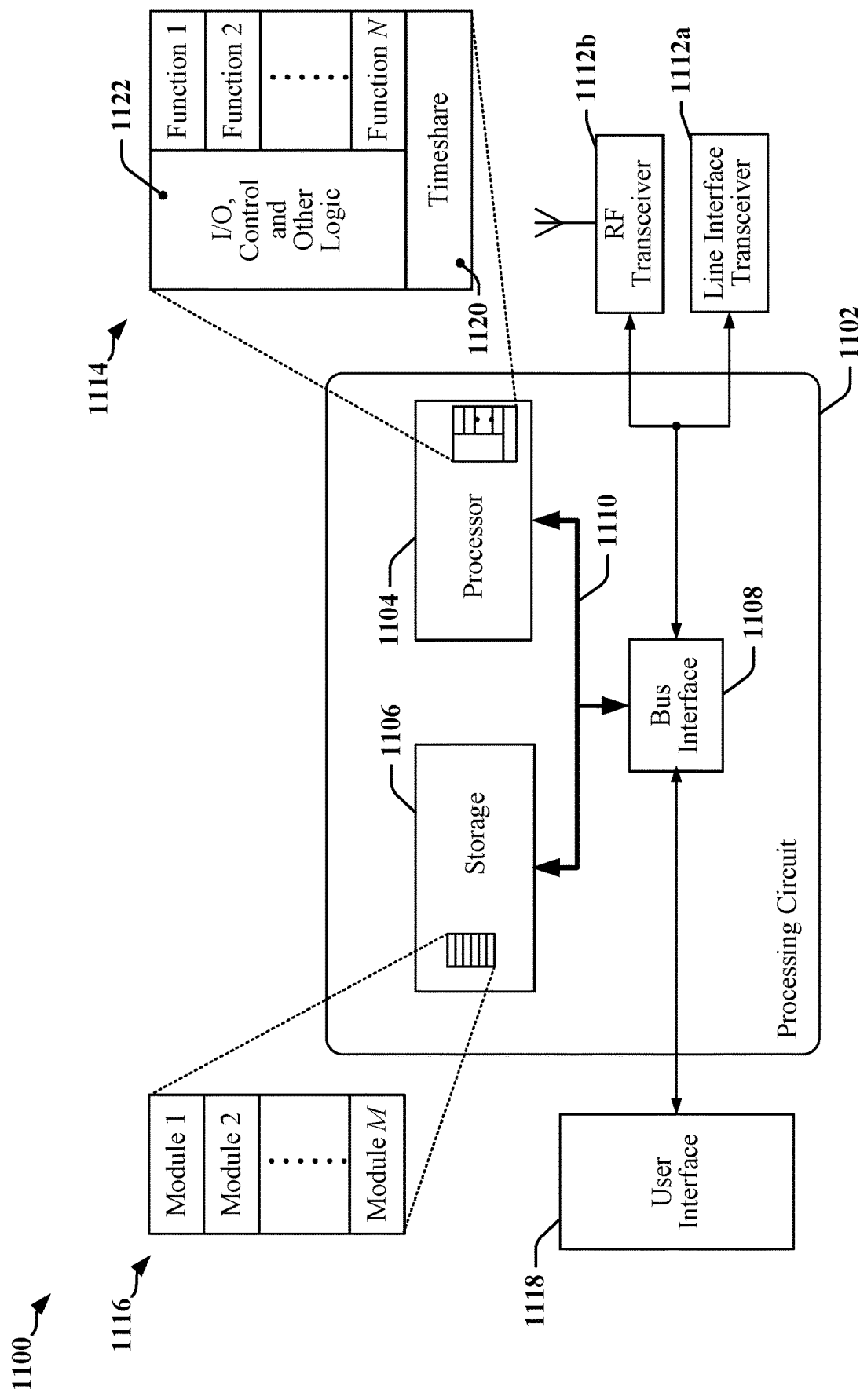
FIG. 11 illustrates one example of an apparatus employing a processing circuit that may be adapted in accordance with certain aspects disclosed herein.

FIG. 11 is a diagram illustrating an example of a hardware implementation for an apparatus 1100. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112a, 1112b. A transceiver 1112a, 1112b may be provided for each networking technology supported by the processing circuit. In some instances, multiple networking technologies may share some or all of the circuitry or processing modules found in a transceiver 1112a, 1112b. Each transceiver 1112a, 1112b provides a means for communicating with various other apparatus over a transmission medium. In one example, a transceiver 1112a may be used to couple the apparatus 1100 to a multi-wire bus. In another example, a transceiver 1112b may be used to connect the apparatus 1100 to a radio access network. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement certain methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. Computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as a transceiver 1112a, 1112b, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to a transceiver 1112a, 1112b, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112a, 1112b, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
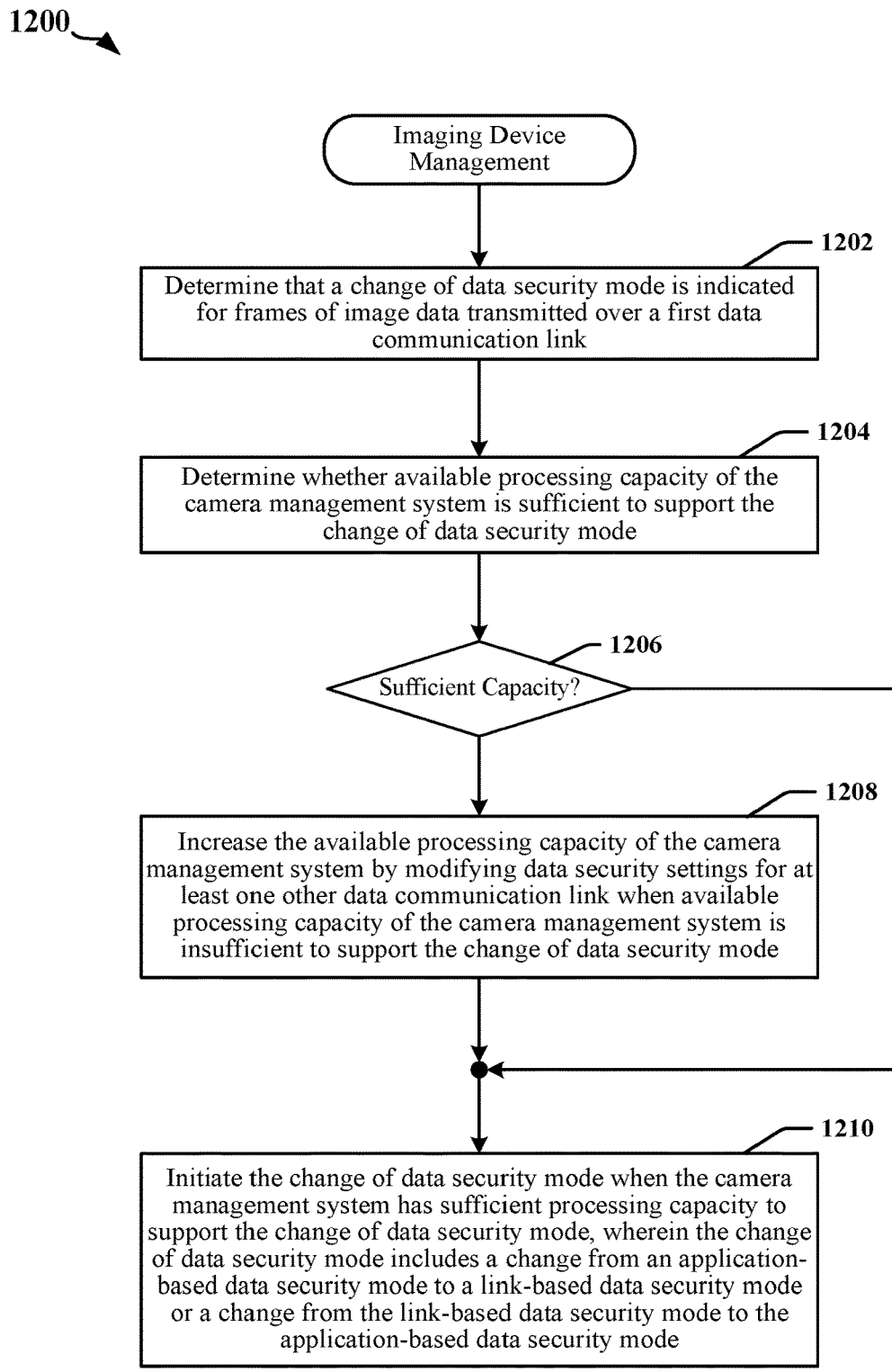
FIG. 12 is a flowchart that illustrates a method for operating a bus interface circuit in accordance with certain aspects disclosed herein.

FIG. 12 is a flowchart 1200 of a method for managing a plurality of imaging devices deployed within a vehicle in accordance with certain aspects of this disclosure. The method may be performed or executed by a controller in the vehicle. At block 1202 in the illustrated method, the controller determines that a change of data security mode is indicated for frames of image data transmitted over a first data communication link. At block 1204 in the illustrated method, the controller calculates, estimates or otherwise determines the current available processing capacity of the sensor management system. If at block 1206 the controller has determined that sufficient processing capacity is available, the controller may proceed to block 1210. If at block 1206 the controller has determined that insufficient processing capacity is available to support the change of data security mode, then at block 1208 the controller may increase the available processing capacity of the sensor management system by modifying data security settings for at least one other data communication link. At block 1210, the controller may initiate the change of data security mode. At block 1210 the sensor management system is expected to have sufficient processing capacity to support the change of data security mode based on the determination made at block 1204 or the action taken to increase the available processing capacity of the sensor management system at block 1208. The change of data security mode may include a change from an application-based data security mode to a link-based data security mode or a change from the link-based data security mode to the application-based data security mode.

In certain examples, the link-based data security mode provides a full integrity mode of data protection for the frames of image data transmitted over the first data communication link. The frames of image data may be encrypted after the link-based data security mode is initiated.

In certain implementations, the application-based data security mode protects a first portion of the frames of image data transmitted over the first data communication link using a MAC. A second portion of the frames of image data may be transmitted over the first data communication link are not protected by a MAC. A stride pattern may be defined that specifies lines of image data in the first portion of the frames of image data that are to be protected by the MAC. A stride pattern may be defined that specifies blocks of pixels in the first portion of the frames of image data that are to be protected by the MAC.

In certain examples, the controller may refrain from initiating the change of data security mode when a power consumption budget or a thermal budget defined for the sensor management system would be exceeded after the change of data security mode was initiated.

In one example, the controller may determine that the change of data security mode is indicated after detecting an increase in temperature or power consumption caused by the sensor management system. In another example, the controller may determine that the change of data security mode is indicated after one or more cameras detect a change in motion based on spatial or temporal dynamic thresholds. In another example, the controller may determine that the change of data security mode is indicated after detecting a high-value camera scene or scene fragment in the image data.

In certain implementations, an AI agent may be used to determine that the change of data security mode is required. The AI agent may be trained using measurements of power or heat obtained for a plurality of operating conditions. The AI agent may be retrained using real-time system feedback. The change of data security mode that is required may be determined based on inferences or predictions received from the AI agent.

Figure 13:
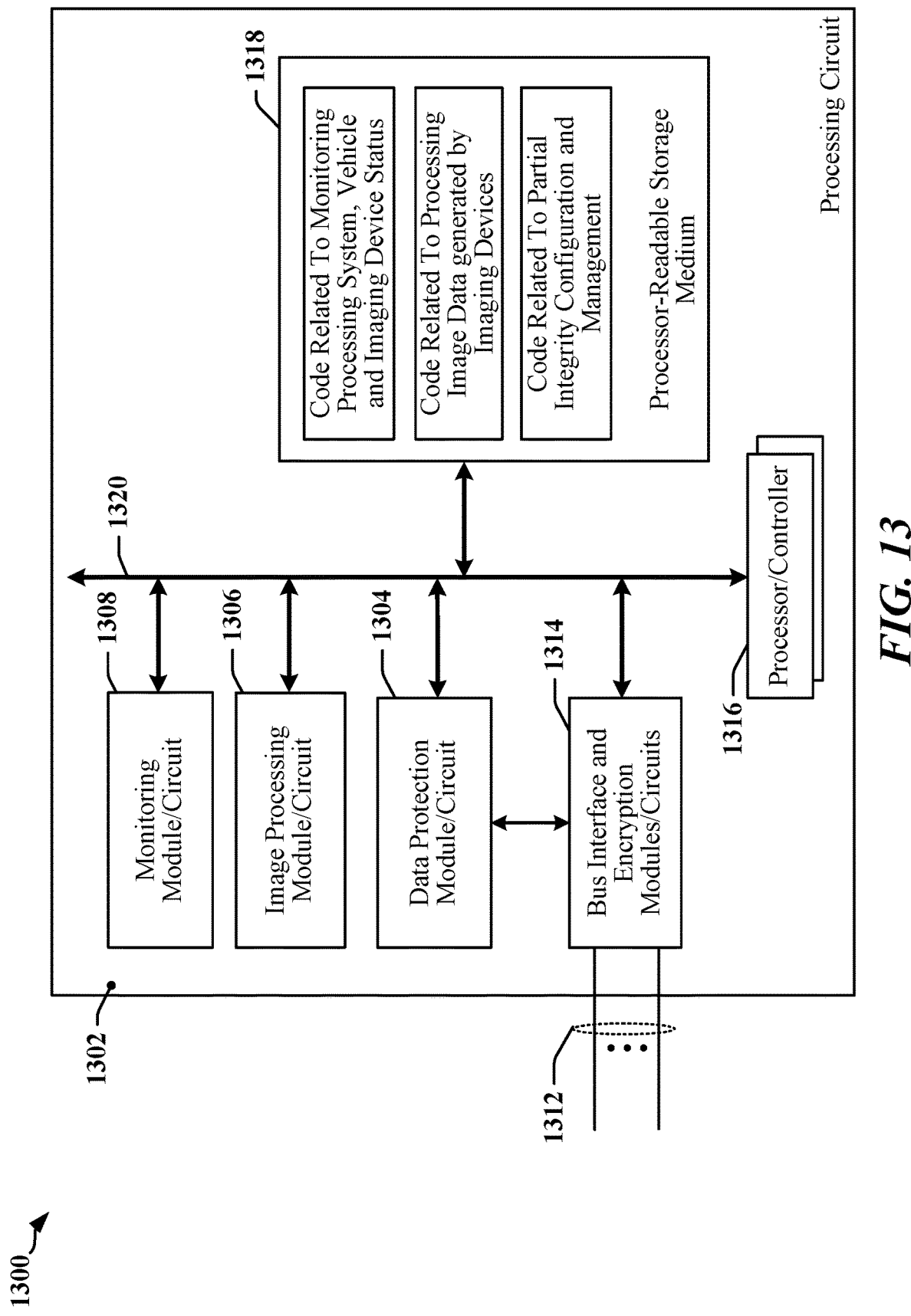
FIG. 13 illustrates a first example of a hardware implementation for a bus interface apparatus adapted in accordance with certain aspects disclosed herein.

FIG. 13 is a diagram illustrating a first example of a hardware implementation for an apparatus 1300 employing a processing circuit 1302. The processing circuit typically has one or more microprocessors, microcontrollers, digital signal processors, sequencers and/or state machines, represented generally by the processors 1316. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including multiple processors 1316, the modules or circuits 1304, 1306 and 1308 and the processor-readable storage medium 1318. A bus interface circuit and/or module 1314 may be provided to support communications over multiple serial links 1312. The bus 1320 may also link various other circuits such as timing sources, peripherals, voltage regulators, and power management circuits, which are well known in the art, and therefore, will not be described any further.

The processors 1316 may be responsible for general processing, including the execution of software, code and/or instructions stored on the processor-readable storage medium 1318. The processor-readable storage medium 1318 may include a non-transitory storage medium. The software, when executed by the processors 1316, causes the processing circuit 1302 to perform the various functions described supra for any particular apparatus. The processor-readable storage medium may be used for storing data that is manipulated by the processors 1316 when executing software. The processing circuit 1302 further includes at least one of the modules 1304, 1306 and 1308. The modules 1304, 1306 and 1308 may be software modules running in the processors 1316, resident/stored in the processor-readable storage medium 1318, one or more hardware modules coupled to the processors 1316, or some combination thereof. The modules 1304, 1306 and 1308 may include microcontroller instructions, state machine configuration parameters, or some combination thereof.

In one configuration, the apparatus 1300 includes modules and/or circuits 1304 configured or adapted to configure and manage data protection of image data. Data protection may be provided in different modes, including full integrity mode that includes encryption, a full integrity mode without encryption and multiple partial integrity modes. In some implementations, encryption in performed at the link layer, and may be performed by the bus interface circuit and/or module 1314. Partial integrity modes may be distinguishable by stride patterns used to identify line of image data or blocks of pixels to be protected. The apparatus 1300 may further include modules and/or circuits 1306 configured or adapted to process image data. In one example, these modules and/or circuits 1306 can perform certain functions as part of an autonomous driving or assisted driving subsystem. The apparatus 1300 may further include modules and/or circuits 1308 configured or adapted to monitor status and operation of the vehicle, of a vehicle management system and/or image data and the modules and/or circuits 1306 configured or adapted to process image data. The status monitoring modules and/or circuits 1308 may generate events that indicate a need for change in data protection provided for one or more data exchanges, for transactions conducted over one or more data communication links, or for transactions involving two or more devices.

The apparatus 1300 may include means for determining that a change of data security mode is indicated for frames of image data transmitted over a first data communication link, means for determining whether available processing capacity of the sensor management system is sufficient to support the change of data security mode, means for increasing the available processing capacity of the sensor management system by modifying data security settings for at least one other data communication link when available processing capacity of the sensor management system is insufficient to support the change of data security mode, and means for initiating the change of data security mode when the sensor management system has sufficient processing capacity to support the change of data security mode. The change of data security mode includes a change from an application-based data security mode to a link-based data security mode or a change from the link-based data security mode to the application-based data security mode.

In certain examples, the link-based data security mode provides a full integrity mode of data protection for the frames of image data transmitted over the first data communication link. The frames of image data may be encrypted after the link-based data security mode is initiated.

In certain implementations, the application-based data security mode protects a first portion of the frames of image data transmitted over the first data communication link using a MAC. A second portion of the frames of image data may be transmitted over the first data communication link are not protected by a MAC. A stride pattern may be defined that specifies lines of image data in the first portion of the frames of image data that are to be protected by the MAC. A stride pattern may be defined that specifies blocks of pixels in the first portion of the frames of image data that are to be protected by the MAC.

In certain examples, the means for initiating the change of data security mode may be configured to refrain from initiating the change of data security mode when a power consumption budget or a thermal budget defined for the sensor management system would be exceeded after the change of data security mode was initiated.

In one example, the means for determining that the change of data security mode is indicated may be configured to determine that the change of data security mode is indicated after detecting an increase in temperature or power consumption caused by the sensor management system. In another example, the means for determining that the change of data security mode is indicated may be configured to determine that the change of data security mode is indicated after one or more cameras detect a change in motion based on spatial or temporal dynamic thresholds. In another example, the means for determining that the change of data security mode is indicated may be configured to determine that the change of data security mode is indicated after detecting a high-value camera scene or scene fragment in the image data.

In certain implementations, the means for determining that the change of data security mode is indicated may be configured to use an AI agent to determine that the change of data security mode is required. The means for determining that the change of data security mode is indicated may be configured to train the AI agent using measurements of power or heat obtained for a plurality of operating conditions, retrain the AI agent using real-time system feedback, and determine the change of data security mode that is required based on inferences or predictions received from the AI agent.

In one aspect, the processing circuit 1302 is coupled to a plurality of imaging devices deployed within a vehicle using a plurality of data communication links. Each data communication link may be configured to couple at least one of the plurality of imaging devices with the processing circuit. The processing circuit 1302 may be configured to determine that a change of data security mode is indicated for frames of image data transmitted over a first data communication link, determine whether available processing capacity of the sensor management system is sufficient to support the change of data security mode, increase the available processing capacity of the sensor management system by modifying data security settings for at least one other data communication link when available processing capacity of the sensor management system is insufficient to support the change of data security mode, and initiate the change of data security mode when the sensor management system has sufficient processing capacity to support the change of data security mode. The change of data security mode may include a change from an application-based data security mode to a link-based data security mode or a change from the link-based data security mode to the application-based data security mode.

In one example, the link-based data security mode provides a full integrity mode of data protection for the frames of image data transmitted over the first data communication link. The frames of image data may be encrypted after the link-based data security mode is initiated.

In certain implementations, the application-based data security mode protects a first portion of the frames of image data transmitted over the first data communication link using a MAC. A second portion of the frames of image data transmitted over the first data communication link may not be protected by a MAC. In one example, the first portion of the frames of image data may be defined by a stride pattern that specifies lines of image data to be protected by the MAC. In another example, the first portion of the frames of image data is defined by a stride pattern that specifies blocks of pixels in the image data to be protected by the MAC.

In some implementations, the processing circuit 1302 is further configured to refrain from initiating the change of data security mode when a power consumption budget or a thermal budget defined for the sensor management system would be exceeded after the change of data security mode was initiated.

In one example, the processing circuit 1302 is further configured to determine that the change of data security mode is indicated after detecting an increase in temperature or power consumption caused by the sensor management system. In another example, the processing circuit 1302 is further configured to determine that the change of data security mode is indicated after one or more cameras detect a change in motion based on spatial or temporal dynamic thresholds. In another example, the processing circuit 1302 is further configured to determine that the change of data security mode is indicated after detecting a high-value camera scene or scene fragment in the image data.

In certain implementations, the processing circuit 1302 is further configured to use an AI agent to determine that the change of data security mode is required. The processing circuit 1302 may be further configured to train the AI agent using measurements of power or heat obtained for a plurality of operating conditions, retrain the AI agent using real-time system feedback, and determine the change of data security mode that is required based on inferences or predictions received from the AI agent.

The processor-readable storage medium 1318 may include code or instructions that, when executed by a processing circuit 1302, causes the processing circuit 1302 to determine that a change of data security mode is indicated for frames of image data transmitted over a first data communication link, determine whether available processing capacity of the sensor management system is sufficient to support the change of data security mode, increase the available processing capacity of the sensor management system by modifying data security settings for at least one other data communication link when available processing capacity of the sensor management system is insufficient to support the change of data security mode, and initiate the change of data security mode when the sensor management system has sufficient processing capacity to support the change of data security mode. The change of data security mode may include a change from an application-based data security mode to a link-based data security mode or a change from the link-based data security mode to the application-based data security mode.

In certain examples, the link-based data security mode provides a full integrity mode of data protection for the frames of image data transmitted over the first data communication link. The frames of image data may be encrypted after the link-based data security mode is initiated.

In certain implementations, the application-based data security mode protects a first portion of the frames of image data transmitted over the first data communication link using a MAC. A second portion of the frames of image data may be transmitted over the first data communication link are not protected by a MAC. A stride pattern may be defined that specifies lines of image data in the first portion of the frames of image data that are to be protected by the MAC. A stride pattern may be defined that specifies blocks of pixels in the first portion of the frames of image data that are to be protected by the MAC. In certain examples, the code or instructions cause the processing circuit 1302 to refrain from initiating the change of data security mode when a power consumption budget or a thermal budget defined for the sensor management system would be exceeded after the change of data security mode was initiated.

In one example, the code or instructions cause the processing circuit 1302 to determine that the change of data security mode is indicated after detecting an increase in temperature or power consumption caused by the sensor management system. In another example, the code or instructions cause the processing circuit 1302 to determine that the change of data security mode is indicated after one or more cameras detect a change in motion based on spatial or temporal dynamic thresholds. In another example, the code or instructions cause the processing circuit 1302 to determine that the change of data security mode is indicated after detecting a high-value camera scene or scene fragment in the image data.

In certain implementations, the code or instructions cause the processing circuit 1302 to use an AI agent to determine that the change of data security mode is required. The code or instructions may further cause the processing circuit 1302 to train the AI agent using measurements of power or heat obtained for a plurality of operating conditions, retrain the AI agent using real-time system feedback, and determine the change of data security mode that is required based on inferences or predictions received from the AI agent.

Some implementation examples are described in the following numbered clauses:

1. A sensor management system, comprising: a plurality of imaging devices deployed within a vehicle; a processing circuit comprising a controller; and a plurality of data communication links, each data communication link coupling at least one of the plurality of imaging devices with the processing circuit, wherein the processing circuit is configured to: determine that a change of data security mode is indicated for frames of image data transmitted over a first data communication link; determine whether available processing capacity of the sensor management system is sufficient to support the change of data security mode; increase the available processing capacity of the sensor management system by modifying data security settings for at least one other data communication link when the available processing capacity of the sensor management system is insufficient to support the change of data security mode; and initiate the change of data security mode when the sensor management system has sufficient processing capacity to support the change of data security mode, wherein the change of data security mode includes a change from an application-based data security mode to a link-based data security mode or a change from the link-based data security mode to the application-based data security mode.
2. The sensor management system as described in clause 1, wherein the link-based data security mode provides a full integrity mode of data protection for the frames of image data transmitted over the first data communication link.
3. The sensor management system as described in clause 2, wherein the frames of image data are encrypted after the link-based data security mode is initiated.
4. The sensor management system as described in any of clauses 1-3, wherein the application-based data security mode protects a first portion of the frames of image data transmitted over the first data communication link using a message authentication code (MAC), and wherein a second portion of the frames of image data transmitted over the first data communication link are not protected by a MAC.
5. The sensor management system as described in clause 4, wherein the first portion of the frames of image data is defined by a stride pattern that specifies lines of image data to be protected by the MAC.
6. The sensor management system as described in clause 4, wherein the first portion of the frames of image data is defined by a stride pattern that specifies blocks of pixels in image data to be protected by the MAC.
7. The sensor management system as described in any of clauses 1-6, wherein the processing circuit is further configured to: refrain from initiating the change of data security mode when a power consumption budget or a thermal budget defined for the sensor management system would be exceeded after the change of data security mode is initiated.
8. The sensor management system as described in any of clauses 1-7, wherein the processing circuit is further configured to: determine that the change of data security mode is indicated after detecting an increase in temperature or power consumption caused by the sensor management system, after one or more cameras detect a change in motion based on spatial or temporal dynamic thresholds, or after detecting a high-value camera scene or scene fragment in image data.
9. The sensor management system as described in any of clauses 1-8, wherein the processing circuit is further configured to: use an artificial intelligence agent to determine that the change of data security mode is required.
10. The sensor management system as described in clause 9, wherein the processing circuit is further configured to: train the artificial intelligence agent using measurements of power or heat obtained for a plurality of operating conditions; retrain the artificial intelligence agent using real-time system feedback; and determine the required change of data security mode based on inferences or predictions received from the artificial intelligence agent.
11. A method for managing a plurality of imaging devices deployed within a vehicle, comprising: determining that a change of data security mode is indicated for frames of image data transmitted over a first data communication link; determining whether available processing capacity of a sensor management system is sufficient to support the change of data security mode; increasing the available processing capacity of the sensor management system by modifying data security settings for at least one other data communication link when the available processing capacity of the sensor management system is insufficient to support the change of data security mode; and initiating the change of data security mode when the sensor management system has sufficient processing capacity to support the change of data security mode, wherein the change of data security mode includes a change from an application-based data security mode to a link-based data security mode or a change from the link-based data security mode to the application-based data security mode.
12. The method as described in clause 11, wherein the link-based data security mode provides a full integrity mode of data protection for the frames of image data transmitted over the first data communication link.
13. The method as described in clause 12, wherein the frames of image data are encrypted after the link-based data security mode is initiated.
14. The method as described in any of clauses 11-13, wherein the application-based data security mode protects a first portion of the frames of image data transmitted over the first data communication link using a message authentication code (MAC), and wherein a second portion of the frames of image data transmitted over the first data communication link are not protected by a MAC.
15. The method as described in clause 14, further comprising: defining a stride pattern that specifies lines of image data in the first portion of the frames of image data that are to be protected by the MAC.
16. The method as described in clause 14, further comprising: defining a stride pattern that specifies blocks of pixels in the first portion of the frames of image data that are to be protected by the MAC.
17. The method as described in any of clauses 11-16, further comprising: refraining from initiating the change of data security mode when a power consumption budget or a thermal budget defined for the sensor management system would be exceeded after the change of data security mode is initiated.
18. The method as described in any of clauses 11-17, further comprising: determining that the change of data security mode is indicated after detecting an increase in temperature or power consumption caused by the sensor management system, after one or more cameras detect a change in motion based on spatial or temporal dynamic thresholds or after detecting a high-value camera scene or scene fragment in image data.

19. The method as described in any of clauses 11-18, further comprising: using an artificial intelligence agent to determine that the change of data security mode is required.

20. The method as described in clause 19, further comprising: training the artificial intelligence agent using measurements of power or heat obtained for a plurality of operating conditions; retraining the artificial intelligence agent using real-time system feedback; and determining the change of data security mode is required based on inferences or predictions received from the artificial intelligence agent.

21. A processor-readable storage medium comprising code that, when executed by a processing circuit, causes the processing circuit to: determine that a change of data security mode is indicated for frames of image data transmitted over a first data communication link; determine whether available processing capacity of a sensor management system is sufficient to support the change of data security mode; increase the available processing capacity of the sensor management system by modifying data security settings for at least one other data communication link when the available processing capacity of the sensor management system is insufficient to support the change of data security mode; and initiate the change of data security mode when the sensor management system has sufficient processing capacity to support the change of data security mode, wherein the change of data security mode includes a change from an application-based data security mode to a link-based data security mode or a change from the link-based data security mode to the application-based data security mode.

22. The processor-readable storage medium as described in clause 21, wherein the link-based data security mode provides a full integrity mode of data protection for the frames of image data transmitted over the first data communication link.

23. The processor-readable storage medium as described in clause 22, wherein the frames of image data are encrypted after the link-based data security mode is initiated.

24. The processor-readable storage medium as described in any of clauses 21-23, wherein the application-based data security mode protects a first portion of the frames of image data transmitted over the first data communication link using a message authentication code (MAC), and wherein a second portion of the frames of image data transmitted over the first data communication link are not protected by a MAC.

25. The processor-readable storage medium as described in clause 24, wherein the code causes the processing circuit to: define a stride pattern that specifies lines of image data in the first portion of the frames of image data that are to be protected by the MAC.

26. The processor-readable storage medium as described in clause 24, wherein the code causes the processing circuit to: define a stride pattern that specifies blocks of pixels in the first portion of the frames of image data that are to be protected by the MAC.

27. The processor-readable storage medium as described in any of clauses 21-26, wherein the code causes the processing circuit to: refrain from initiating the change of data security mode when a power consumption budget or a thermal budget defined for the sensor management system would be exceeded after the change of data security mode is initiated.

28. The processor-readable storage medium as described in any of clauses 21-27, wherein the code causes the processing circuit to: determine that the change of data security mode is indicated after detecting an increase in temperature or power consumption caused by the sensor management system, after one or more cameras detect a change in motion based on spatial or temporal dynamic thresholds or after detecting a high-value camera scene or scene fragment in image data.

29. The processor-readable storage medium as described in any of clauses 21-28, wherein the code causes the processing circuit to: use an artificial intelligence agent to determine that the change of data security mode is required.

30. The processor-readable storage medium as described in clause 29, wherein the code causes the processing circuit to: train the artificial intelligence agent using measurements of power or heat obtained for a plurality of operating conditions; retrain the artificial intelligence agent using real-time system feedback; and determine the required change of data security mode based on inferences or predictions received from the artificial intelligence agent.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A sensor management system, comprising:
a plurality of imaging devices deployed within a vehicle;
a processing circuit comprising a controller; and
a plurality of data communication links, each data communication link coupling at least one of the plurality of imaging devices with the processing circuit, wherein the processing circuit is configured to:
  determine that a change of data security mode is indicated for frames of image data transmitted over a first data communication link;
  determine whether available processing capacity of the sensor management system is sufficient to support the change of data security mode;
  increase the available processing capacity of the sensor management system by modifying data security settings for at least one other data communication link when the available processing capacity of the sensor management system is insufficient to support the change of data security mode; and
  initiate the change of data security mode when the sensor management system has sufficient processing capacity to support the change of data security mode,
  wherein the change of data security mode includes a change from an application-based data security mode to a link-based data security mode or a change from the link-based data security mode to the application-based data security mode.

2. The sensor management system of claim 1, wherein the link-based data security mode provides a full integrity mode of data protection for the frames of image data transmitted over the first data communication link.

3. The sensor management system of claim 2, wherein the frames of image data are encrypted after the link-based data security mode is initiated.

4. The sensor management system of claim 1, wherein the application-based data security mode protects a first portion of the frames of image data transmitted over the first data communication link using a message authentication code (MAC), and wherein a second portion of the frames of image data transmitted over the first data communication link are not protected by a MAC.

5. The sensor management system of claim 4, wherein the first portion of the frames of image data is defined by a stride pattern that specifies lines of image data to be protected by the MAC.

6. The sensor management system of claim 4, wherein the first portion of the frames of image data is defined by a stride pattern that specifies blocks of pixels in image data to be protected by the MAC.

7. The sensor management system of claim 1, wherein the processing circuit is further configured to:
  refrain from initiating the change of data security mode when a power consumption budget or a thermal budget defined for the sensor management system would be exceeded after the change of data security mode is initiated.

8. The sensor management system of claim 1, wherein the processing circuit is further configured to:
  determine that the change of data security mode is indicated after detecting an increase in temperature or power consumption caused by the sensor management system, after one or more cameras detect a change in motion based on spatial or temporal dynamic thresholds or after detecting a high-value camera scene or scene fragment in image data.

9. The sensor management system of claim 1, wherein the processing circuit is further configured to:
  use an artificial intelligence agent to determine that the change of data security mode is required.

10. The sensor management system of claim 9, wherein the processing circuit is further configured to:
  train the artificial intelligence agent using measurements of power or heat obtained for a plurality of operating conditions;
  retrain the artificial intelligence agent using real-time system feedback; and
  determine the required change of data security mode based on inferences or predictions received from the artificial intelligence agent.

11. A method for managing a plurality of imaging devices deployed within a vehicle, comprising:
  determining that a change of data security mode is indicated for frames of image data transmitted over a first data communication link;
  determining whether available processing capacity of a sensor management system is sufficient to support the change of data security mode;
  increasing the available processing capacity of the sensor management system by modifying data security settings for at least one other data communication link when the available processing capacity of the sensor management system is insufficient to support the change of data security mode; and
  initiating the change of data security mode when the sensor management system has sufficient processing capacity to support the change of data security mode,
  wherein the change of data security mode includes a change from an application-based data security mode to a link-based data security mode or a change from the link-based data security mode to the application-based data security mode.

12. The method of claim 11, wherein the link-based data security mode provides a full integrity mode of data protection for the frames of image data transmitted over the first data communication link.

13. The method of claim 12, wherein the frames of image data are encrypted after the link-based data security mode is initiated.

14. The method of claim 11, wherein the application-based data security mode protects a first portion of the frames of image data transmitted over the first data communication link using a message authentication code (MAC), and wherein a second portion of the frames of image data transmitted over the first data communication link are not protected by a MAC.

15. The method of claim 14, further comprising:
  defining a stride pattern that specifies lines of image data in the first portion of the frames of image data that are to be protected by the MAC.

16. The method of claim 14, further comprising:
  defining a stride pattern that specifies blocks of pixels in the first portion of the frames of image data that are to be protected by the MAC.

17. The method of claim 11, further comprising:
  refraining from initiating the change of data security mode when a power consumption budget or a thermal budget defined for the sensor management system would be exceeded after the change of data security mode is initiated.

18. The method of claim 11, further comprising:
  determining that the change of data security mode is indicated after detecting an increase in temperature or power consumption caused by the sensor management system, after one or more cameras detect a change in motion based on spatial or temporal dynamic thresholds or after detecting a high-value camera scene or scene fragment in image data.

19. The method of claim 11, further comprising:
using an artificial intelligence agent to determine that the change of data security mode is required.

20. The method of claim 19, further comprising:
training the artificial intelligence agent using measurements of power or heat obtained for a plurality of operating conditions;
retraining the artificial intelligence agent using real-time system feedback; and
determining the change of data security mode is required based on inferences or predictions received from the artificial intelligence agent.

21. A processor-readable storage medium comprising code that, when executed by a processing circuit, causes the processing circuit to:
determine that a change of data security mode is indicated for frames of image data transmitted over a first data communication link;
determine whether available processing capacity of a sensor management system is sufficient to support the change of data security mode;
increase the available processing capacity of the sensor management system by modifying data security settings for at least one other data communication link when the available processing capacity of the sensor management system is insufficient to support the change of data security mode; and
initiate the change of data security mode when the sensor management system has sufficient processing capacity to support the change of data security mode,
wherein the change of data security mode includes a change from an application-based data security mode to a link-based data security mode or a change from the link-based data security mode to the application-based data security mode.

22. The processor-readable storage medium of claim 21, wherein the link-based data security mode provides a full integrity mode of data protection for the frames of image data transmitted over the first data communication link.

23. The processor-readable storage medium of claim 22, wherein the frames of image data are encrypted after the link-based data security mode is initiated.

24. The processor-readable storage medium of claim 21, wherein the application-based data security mode protects a first portion of the frames of image data transmitted over the first data communication link using a message authentication code (MAC), and wherein a second portion of the frames of image data transmitted over the first data communication link are not protected by a MAC.

25. The processor-readable storage medium of claim 24, wherein the code causes the processing circuit to:
define a stride pattern that specifies lines of image data in the first portion of the frames of image data that are to be protected by the MAC.

26. The processor-readable storage medium of claim 24, wherein the code causes the processing circuit to:
define a stride pattern that specifies blocks of pixels in the first portion of the frames of image data that are to be protected by the MAC.

27. The processor-readable storage medium of claim 21, wherein the code causes the processing circuit to:
refrain from initiating the change of data security mode when a power consumption budget or a thermal budget defined for the sensor management system would be exceeded after the change of data security mode is initiated.

28. The processor-readable storage medium of claim 21, wherein the code causes the processing circuit to:
determine that the change of data security mode is indicated after detecting an increase in temperature or power consumption caused by the sensor management system, after one or more cameras detect a change in motion based on spatial or temporal dynamic thresholds or after detecting a high-value camera scene or scene fragment in image data.

29. The processor-readable storage medium of claim 21, wherein the code causes the processing circuit to:
use an artificial intelligence agent to determine that the change of data security mode is required.

30. The processor-readable storage medium of claim 29, wherein the code causes the processing circuit to:
train the artificial intelligence agent using measurements of power or heat obtained for a plurality of operating conditions;
retrain the artificial intelligence agent using real-time system feedback; and
determine the required change of data security mode based on inferences or predictions received from the artificial intelligence agent.

* * * * *